US008661458B2

(12) United States Patent
Sakai

(10) Patent No.: US 8,661,458 B2
(45) Date of Patent: Feb. 25, 2014

(54) MULTIPROCESSOR SYSTEM, AND METHOD FOR SHARED USE OF DEVICES AMONG OPERATING SYSTEMS OF MULTIPROCESSOR SYSTEM

(75) Inventor: Junji Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 837 days.

(21) Appl. No.: 12/919,636

(22) PCT Filed: Feb. 24, 2009

(86) PCT No.: PCT/JP2009/053236
§ 371 (c)(1),
(2), (4) Date: Aug. 26, 2010

(87) PCT Pub. No.: WO2009/113381
PCT Pub. Date: Sep. 17, 2009

(65) Prior Publication Data
US 2010/0325329 A1    Dec. 23, 2010

(30) Foreign Application Priority Data
Mar. 11, 2008    (JP) ................................. 2008-060804

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ......................................................... 719/321

(58) Field of Classification Search
None
See application file for complete search history.

(56) References Cited

U.S. PATENT DOCUMENTS 6,085,277 A *   7/2000   Nordstrom et al. ............ 710/263
7,647,446 B2 *   1/2010   Okuma ......................... 710/313

FOREIGN PATENT DOCUMENTS

| JP | 2-072461 A | 3/1990 |
| JP | 4-264947 A | 9/1992 |
| JP | 10-021203 A | 1/1998 |
| JP | 2007-241562 A | 9/2007 |

OTHER PUBLICATIONS

Y. Oguchi et al., "Server Virtualization Technology and Its Latest Trends", Fijitsu, vol. 58, No. 5, Sep. 10, 2007, pp. 426-430.

(Continued)

*Primary Examiner* — Emerson Puente
*Assistant Examiner* — Kimbleann Verdi
(74) *Attorney, Agent, or Firm* — Sughrue Mion, PLLC

(57) ABSTRACT

In a multiprocessor system with a plurality of Operating Systems (OSs) running thereon, each of the plurality of OSs has a device driver which accesses devices for shared use among the OSs. Each device driver has a task interface part which performs inter-Operating System communication at the Operating System (OS) kernel layer. A first device driver on one of the plurality of OSs includes a device interface part which accesses a device to be operated by a second device driver on a second one of the plurality of OSs. The task interface part of the second device driver receives a device access request from a task running on the second one of the plurality of OSs, adds processing request data to a request queue list of the first device driver, and returns a device access result to the task upon receipt of a notification from the device interface part.

15 Claims, 18 Drawing Sheets

(56) References Cited

OTHER PUBLICATIONS

A. Amagai et al., "Isochronous packet transmission on Ethernet", IEICE Technical Report, vol. 104, No. 718, Mar. 7, 2005, pp. 1-6.
Japanese Office Action for JP Application No. 2010-502756 mailed on Jun. 12, 2013 with English Translation.
International Search Report for PCT Application No. PCT/JP2009/053236 mailed on Apr. 14, 2009.
M. Edahiro et al., "Development, and Application to Cell Phone, of Software Platform for Multi-core System," Nikkei Electronics, Mar. 28, 2005, pp. 125-135.
J. Sakai et al., "Software Platform for Embedded Multi-core Processor," Information Processing, vol. 47 No. 1, Information Processing Society of Japan, Jan. 2006, pp. 29-33.
O. Koshigoe, "Hardware Kasoka ni yoru Fukusu OS no Hiretsu Jikko", Interface, vol. 33, No. 11, pp. 94-102.
H. Takahashi. "Kaso Machine Monitor Xen3.0 Kaidokushitsu", OSM, vol. 15, No. 4, Apr. 1, 2006, pp. 163-170.
A. Cockcroft, "Performance Tuning 27 Seikakuna Riyoritsu, Oto Jikan o Sanshutsu suru", Sunworld, vol. 10, No. 3, Mar. 1, 2000, pp. 106-110.
H. Takada et al., "Device Driver no Jisso, Real-Time OS to Kumikomi Gijutsu no Kiso", Techi, Technology Interface, vol. 17, Jul. 1, 2003, pp. 141-168.

\* cited by examiner

MULTIPROCESSOR SYSTEM, AND METHOD FOR SHARED USE OF DEVICES AMONG OPERATING SYSTEMS OF MULTIPROCESSOR SYSTEM

TECHNICAL FIELD

The present invention relates to a multiprocessor system with a plurality of operating systems running thereon, and more particularly to a multiprocessor system and a method for shared use of devices among the plurality of operating systems.

BACKGROUND ART

In using a multi-core processor, having a plurality of homogeneous or heterogeneous operating systems run thereon is a useful approach to improve the reliability and responsiveness of the system as a whole.

On the other hand, there is a challenge for such approach in implementing shared use among the plurality of operating systems (hereinafter, "OSs") running on the multi-core processor of a variety of peripheral devices, including DMA controllers, graphic accelerators, multimedia-dedicated engines, HDDs and controllers (hereinafter collectively, "devices"). This is because the role of an OS to manage device is a closed loop within the OS and, therefore, devices under management of a particular OS are not expected to be accessed by other OSs.

One method for shared use of devices among a plurality of OSs is a client-server approach as disclosed in Non-patent Literature 1 and Non-patent Literature 2. The client-server approach limits the number of OSs that can access devices to one, and causes a server task, which is called an "access server," to run on that OS. Tasks on the other OS(s) communicate with the access server via inter-OS communication to delegate accesses to devices to the access server. The access server is also called a "proxy" because it performs the role of accessing devices.

Non-Patent Literature 1: Masato EDAHIRO et al., "Development, and Application to Cell Phone, of Software Platform for Multi-core System," NIKKEI ELECTRONICS, Mar. 28, 2005, pp. 125-136

Non-Patent Literature 2: Junji SAKAI et al., "Software Platform for Embedded Multi-core Processor," Information processing, Vol. 47, No. 1, Information Processing Society of Japan, January 2006, pp 29-33

However, the client-server approach disclosed in Non-patent Literature 1 and Non-patent Literature 2 has a few drawbacks as described below.

The first drawback is a reduction in the performance of device access via a server, because every time a request for device access is submitted to a server, the current task needs to be switched to the proxy, or the access server. This drawback is particularly problematic with such devices as graphic accelerators and HDDs, to which the speed of access is of critical importance.

The second drawback is high development cost, because the approach requires a function that serves as a proxy to be implemented in access server for each of the different types of device access.

For example, it is not rare that several tens, or even several hundreds, of APIs (Application Program Interfaces) are provided for application developers to access a multi-functional device like a graphic accelerator or HDD. In such a case, the cost required for developing proxies for these APIs and stab routines that are routed through these proxies may sometimes mount to an inhibiting level.

EXEMPLARY OBJECT OF INVENTION

An object of the present invention is to provide a multiprocessor system and a method for shared use of devices among the OSs of the multiprocessor system which can curb a reduction in device access performance.

Another object of the present invention is to provide a multiprocessor system and a method for shared use of devices among the OSs of the multiprocessor system which can keep low the development cost necessary to implement shared use of devices among the OSs.

SUMMARY

According to a first exemplary aspect of the invention, a multiprocessor system in which a plurality of OSs run, wherein each of the plurality of OSs having a device driver which accesses a device shared among the plurality of OSs, wherein the device driver comprises at least either of a device interface part or a task interface part which performs inter-OS communication at an OS kernel layer, wherein the device interface part accesses a device to be operated by the device driver and the task interface part receives a device access request from a task running on each OS and returns a device access result to the task.

According to a second exemplary aspect of the invention, a device driver which, in a multiprocessor system with a plurality of OSs running thereon, is provided in each of the plurality of OSs that accesses devices for shared use among the plurality of OSs, includes at least either of a device interface part or a task interface part which performs inter-OS communication at an OS kernel layer, wherein the device interface part accesses a device to be operated by the device driver and the task interface part receives a device access request from a task running on each OS and returns a device access result to the task.

According to a third exemplary aspect of the invention, an inter-OS device sharing method for a multiprocessor system with a plurality of OSs running thereon, each of the plurality of OSs having a device driver to access devices for shared use among the plurality of OSs, wherein the device driver comprises at least either of a device interface part or a task interface part, the device interface part and the task interface part performs inter-OS communication mutually at an OS kernel layer, the device interface part accesses a device to be operated by the device driver, and the task interface part receives a device access request from a task running on each OS and returns a device access result to the task.

A first effect of the present invention is that, in a client-server approach, the invention improves the performance of device access from the client side task.

A second effect of the present invention is that the invention can keep low the cost for developing software for shared use of devices.

DETAILED DESCRIPTION

Exemplary embodiments of the present invention will now be described in detail with reference to the drawings.

Figure 1:
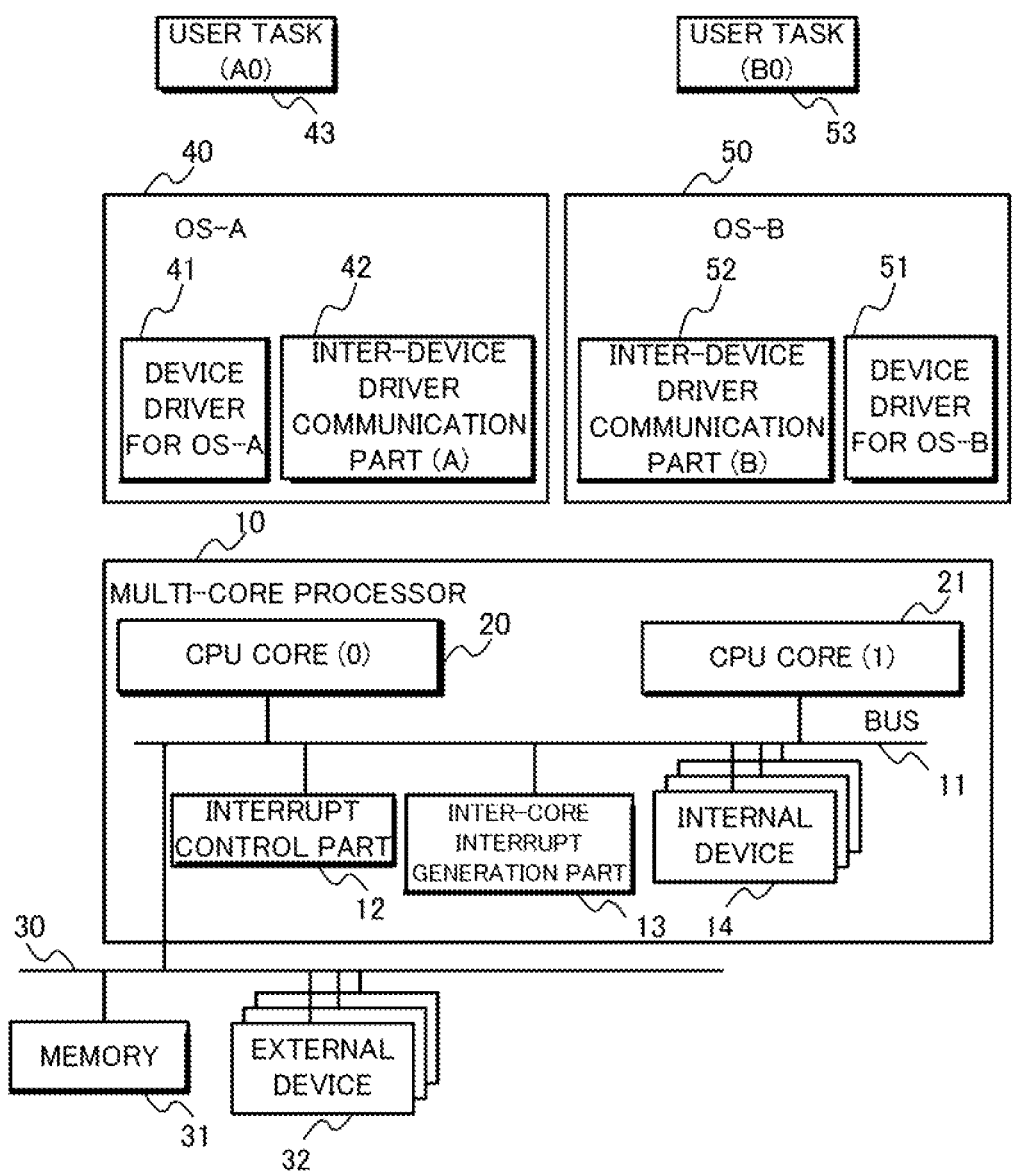
FIG. 1 is a block diagram showing an overall system structure according to a first exemplary embodiment of the present invention.

As shown in FIG. 1, a shared-memory type multiprocessor system with a plurality of OSs according to the first exemplary embodiment of the present invention has a structure which includes a multi-core processor 10, OS-A 40 and OS-B 50, which are two OSs of different types, user tasks 43, 53, which are running on each of the OSs, and a memory 31, which is connected to the external bus 30 of the multi-core processor 10.

The multi-core processor 10 is structured by comprising two CPU cores, i.e. CPU core (0) 20 and CPU core (1) 21, an interrupt control part 12, an inter-core interrupt generation part 13, which, among various kinds of interrupt, particularly generates interrupts between CPU cores, and an internal device 14, which is shared among the OS. All these elements are connected among one another via an intra-processor bus 11.

Turing our eyes to the software on the CPU cores, OS-A 40 is running on the CPU core (0) 20. OS-A 40 has a device driver 41 incorporated therein to access the internal device 14. On this OS, a user task (A0) 43 exists which accesses the internal device 14.

OS-A 40 has an inter-device driver communication part (A) 42 to communicate with an adjoining other OS.

Similarly, OS-B 50 is running on CPU core (1) 21. OS-B 50 has a device driver 51 incorporated therein to access the internal device 14. On this OS, a user task (B0) 53 exists which accesses the internal device 14.

OS-B 50 has an inter-device driver communication part (B) 52 to communicate with an adjoining other OS.

Although FIG. 1 shows a structure in which two CPU cores are included as the multi-core processor 10 and two different types of OSs operate on these CPU cores, it will be appreciated that the invention is not limited to a multi-core processor with two cores but may be applied to any structure with a plurality of CPU cores, including one in which three or more OSs operate.

In addition, although two devices, i.e. an internal device 14 and an external device 32, in FIG. 1 are respectively connected to the internal bus 11 and the external bus 30 of the multi-core processor 10, the application of the invention is not restricted to such number of devices or to such distinction between internal and external devices. Furthermore, the invention may be applied as is, even where an interrupt control part 12, an inter-core interrupt generation part 13 and so on are connected to the external bus 30 of the multi-core processor 10.

As a most typical example, a case where the multi-core processor has two cores and the internal device 14 connected to its internal bus is shared by the two OSs, will be described in detail below.

First, the structure of the device driver, one of the main components of the present invention, will be described.

Figure 2:
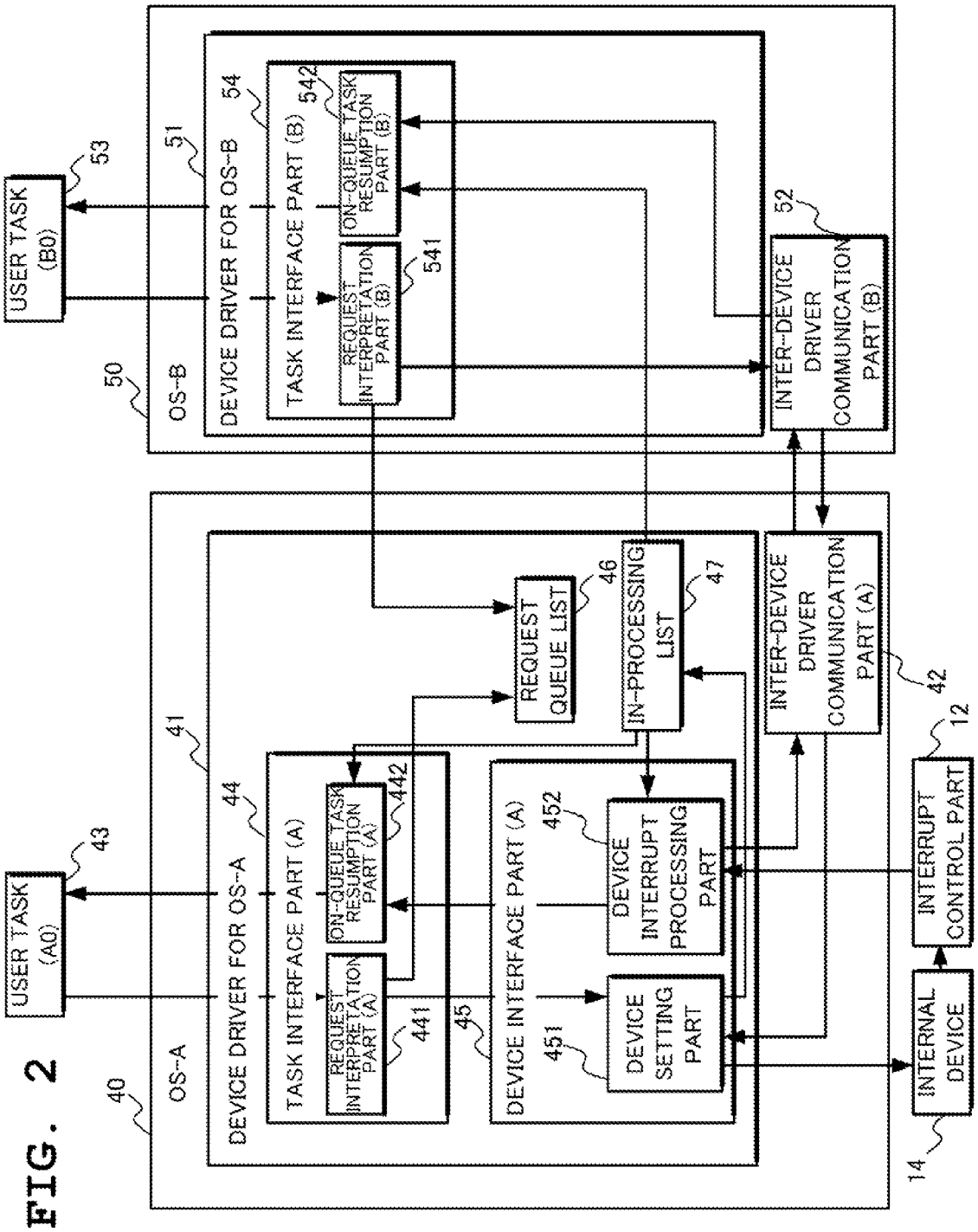
FIG. 2 is a diagram showing the internal structures of device drivers running on OS-A and OS-B according to the first exemplary embodiment of the present invention.

With reference to FIG. 2, the device driver 41 for OS-A, which is incorporated in OS-A 40, comprises a task interface part (A) 44, which accepts a request from the user task (A) 43 and returns a processing result to the user task (A) 43; a device interface part (A) 45, which controls the operation of or observes the state of the internal device 14 and receives a result from the device; a request queue list 46, which is an area to store processing requests which have been accepted by the task interface part (A) 44 from the user task but the processing of which is yet to be started by the subject internal device; and an in-processing list 47, which is an area to store information on the processing being executed by the subject device.

The task interface part (A) 44 comprises therein a request interpretation part (A) 441, which accepts a processing request from the user task (A) 43, and an on-queue task resumption part (A) 442, which controls the operation of the user task and returns a processing result to the user task (A) 43.

The device interface part (A) 45 comprises therein a device setting part 451, which sets a value in, for example, the register of the internal device 14 and handles communication interrupts from the device driver on the other OS, and a device interrupt processing part 452, which handles interrupts from the internal device 14.

OS-A 40 comprises therein an inter-device driver communication part (A) 42, which performs communication with the device driver on the other OS, in addition to the device driver 41 for OS-A. On OS-A 40, the user task (A0) 43, which submits access requests to the internal device 14, is running.

The internal device 14 is connected to the interrupt control part 12, which generates an interrupt to the CPU core, so that it can communicate to the OS side that its state has changed, e.g. that the given processing has completed.

OS-B 50 has a similar internal structure to OS-A 40, except that the former does not have the device interface part (A) 45 and the data structures (i.e. a request queue list 46 and an in-processing list 47) included therein. Also by referring to FIG. 2, the internal structure of OS-B will be described below.

The device driver 51 for OS-B incorporated in OS-B 50 comprises a task interface part (B) 54, which accepts a request from the user task (B) 53 and returns a processing result to the user task (B) 53. OS-B 50 also comprises an inter-device driver communication part (B) 52, which performs communication between the device driver 51 for OS-B and the device driver 41 for OS-A.

The task interface part (B) 54 comprises therein a request interpretation part (B) 541, which accepts a processing request from the user task (B) 53, and an on-queue task resumption part (B) 542, which controls the operation of the user task and returns a processing result to the user task.

The structure described above, wherein a device driver consists of a task interface part and a device interface part, the device driver on the OS which directly accesses a device (i.e. OS-A 40) incorporating both the task interface part and the device interface part while the device driver on the other OS (i.e. OS-B50) incorporating the task interface part only, and the task interface part of the OS which does not directly access a device and the device interface part of the OS which directly accesses a device are connected via inter-device driver communication, is the structure characteristic of, and essential to, the present invention.

Figure 3:
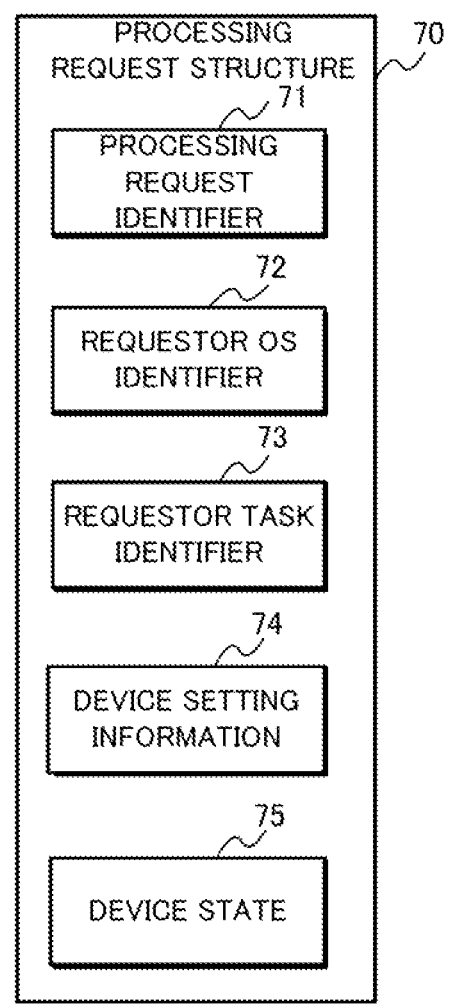
FIG. 3 is a diagram showing the internal structure of a processing request structure according to the first exemplary embodiment of the present invention.

The request queue list 46 and the in-processing list 47 use the processing request structure 70 shown in FIG. 3 as their data elements. These data elements are configured such that they are linked with one another via the lists. An instance of the processing request structure 70 is created and linked with the request queue list 46 by the request interpretation part of the task interface part of the device driver on each OS.

At the start of the processing by the subject internal device, the instance of the processing request structure 70 is removed from the request queue list 46 and transferred to the in-processing list 47.

Finally, the on-queue task resumption part of the task interface part of the device driver on each OS removes the instance of the processing request structure within the in-processing list 47 and returns a processing result to the requestor user task, i.e. the user task which invoked the processing.

The most basic structure is designed such that the processings requested to a particular device will be executed by the device in the order of arrival of requests from user tasks. In such structure, the request queue list 46 and the in-processing list 47 may be implemented as a FIFO (first-in first-out).

Returning to FIG. 3, the processing request structure 70 has fields therein as described below.

The processing request identifier 71 is an identifier which uniquely identifies an instance of the processing request structure 70. The requestor OS identifier 72 is an identifier which identifies the OS on which the user task that has requested the current processing is running. In the example of FIG. 2, this identifier identifies either OS-A 40 or OS-B 50. The requestor task identifier 73 is an identifier which uniquely identifies, within the OS on which the user task is running, the user task that has submitted the current request for a processing. In many cases, the task IDs assigned to the tasks under management of an OS are used as this identifier.

The device setting information 74 contains information concerning the value that should be set by the device driver in the subject internal device in accordance with a request from a user task. For example, if the device driver is a DMA controller, the device setting information 74 would be source and destination addresses and the size of a transfer. If the device driver is a graphic accelerator, then this information would be a sequence of 3D draw commands.

Thus, the content of the device setting information 74 may largely vary from one device to another. However, the device setting information 74 associated with the processing request identifier 71 for a particular device is always configured to be of the same size. By this, memory management for instances of the processing request structure 70 becomes easier. The area for the device setting information 74 is configured to have a size sufficiently large to hold data of the maximum size that is reasonably anticipated as device setting information. If necessary, the content of a processing request may be divided into several segments and expressed by using more than one processing request identifiers. The step of dividing the content is performed by the task interface part 44, 54.

The device state 75 is a field to store a result obtained from the processing of a user request by an internal device. In the case of a DMA controller, graphic accelerator or other similar device, the content stored in the device state 75 is a simple integer value which indicates a success or failure of the processing of a request. In the case of a HDD controller, however, the data stored in the device state 75 may be large in size such as a data string read from the HDD.

The device state 75 is designed such that it is overwritten by a subsequent device processing or, after a completion interrupt is communicated to the OS side for reasons such as that a subsequent device processing has been prevented from starting, it holds only data that must be promptly retrieved from the device. In addition, the device state 75 is designed such that its size always remains the same for a particular device. Similar to the case of the device setting information 74, this is necessary to facilitate memory management.

Next, with reference to FIG. 4, the structure of the inter-device driver communication part will be described. This is an element of the exemplary embodiment that plays an important role in the improvement of device access performance. One inter-device driver communication part is provided for each OS, but they are the same in structure. Although the description below concerns the inter-device driver communication part (A) 42 on the OS-A 40 side, it similarly applies to the inter-device driver communication part (B) 52 on the OS-B 50.

Inter-device driver communication performed by this exemplary embodiment is based on a concept similar to that for a remote procedure call (RPC), in that the routine previously registered in an OS is invoked by another OS. However, a characteristic of communication between device drivers according to this exemplary embodiment is that most part of communication is performed within an interrupt handler. This characteristic brings about an effect of reducing communication overhead.

The inter-device driver communication part (A) 42 on the OS-A 40 side comprises, in relation to the pre-registration of routines, an invoked routine registration table (A) 422, which holds routines registered on the OS-A 40 side, and an invoked routine registration part (A) 421; which registers routines in that table in advance.

In addition, the inter-device driver communication part (A) 42 comprises, in relation to the management of statuses of routines invoked by another OS, an invocation request list (A) 423, which is used for the management of invocation requests for registered routines on the OS-A side that are yet to be executed, and an invoked state storage part (A). 424, which indicates whether or not any of the registered routines has currently been invoked by the inter-device driver communication part (A) 42.

The inter-device driver communication part (A) 42 also comprises, in relation to the operation of invoking or being invoked by the other party, two processing parts as described below.

One is an invocation processing part (A) 426, which, in response to a request from the device driver 41 for OS-A, performs the processing of invoking the inter-device driver communication part on the other OS by generating an inter-core interrupt. The other is an invoked processing part (A) 425, which, upon receiving the request from the other OS via the inter-core interrupt, performs the processing of invoking the corresponding registered routine.

The invocation processing part (A) 425 is preferably invoked, as a processing within the interrupt handler, directly by the interrupt acceptance part 48 of OS-A 40, in order to increase communication speed.

However, if priority is given to minimizing the interrupt disabled time and making the interrupt handler as light as possible, the invention may be configured such that many of the processings performed by the invoked processing part (A) 425 are implemented as kernel task, i.e. tasks or threads that run within the OS kernel. In this case, the interrupt acceptance part 48 of OS-A 40 is simply responsible for launching these kernel tasks.

Figure 5:
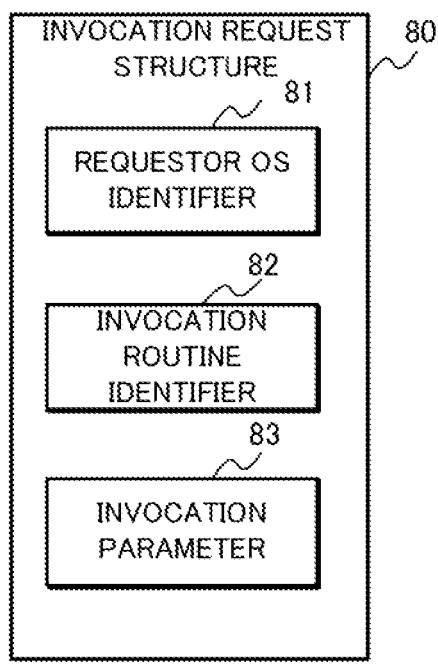
FIG. 5 is a diagram showing the internal structure of an invocation requesting structure according to the first exemplary embodiment of the present invention.

In the invocation request list (A) 423, only instances of the invocation request structure 80 as shown in FIG. 5 are stored. The invocation request structure 80 comprises three fields: a requestor OS identifier 81, an invocation routine identifier 82, and an invocation parameter 83.

The requestor OS identifier 81 is an identifier which identifies the OS on which the device driver that has requested the current processing is running. In the example of FIG. 2, this identifier identifies OS-B 50. Since OS-B 50 is the only OS other than OS-A 40 in this exemplary embodiment, "OS-B 50" is the only possible value for the requestor OS identifier 81. If three or more OSs are running, then it is possible that the requestor OS identifier 81 takes more than one value.

The invocation routine identifier 82 specifies one of the routines registered in the invoked routine registration table 422.

The invocation parameter 83 is an area to store a set of parameters (arguments) that are used when an invoked routine is executed. While the composition of a parameter set varies from one invocation routine to another, it is preferable that each of the fields of the invocation parameter 83 is made to be of a small fixed size, by designing an invocation routine such that it requires a minimum number of small-size parameters. This is necessary to facilitate memory management, similar to the case of the device setting information 74.

Figure 6:
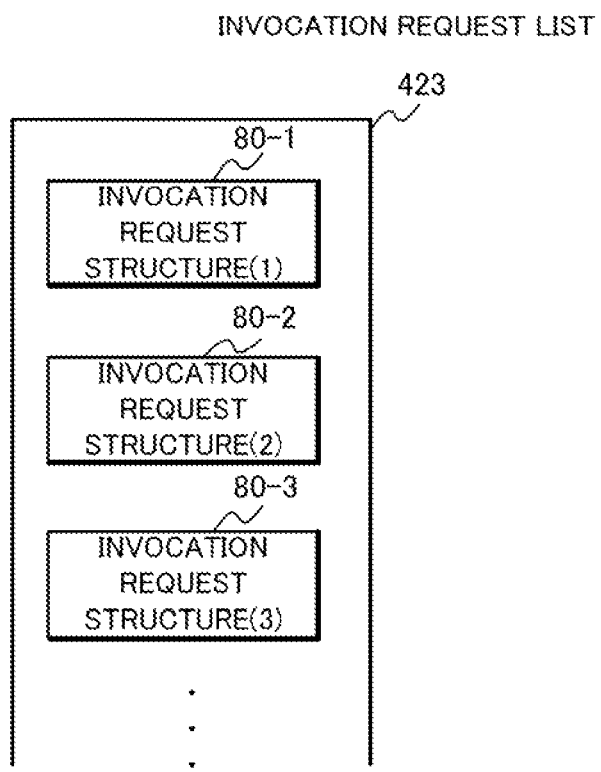
FIG. 6 is a diagram showing the internal structure of an invocation request list according to the first exemplary embodiment of the present invention.

The invocation request list (A) 423 is a list structure in which instances of the invocation request structure 80 are stored in a FIFO, as shown in FIG. 6. In the example of FIG. 6, the invocation request structure 80 stores information in the order of the invocation request structure (1) 80-1, the invocation request structure (2) 80-2, the invocation request structure (3) 80-3 and so on, which are retrieved in the order of the invocation request structure (1) 80-1, the invocation request structure (2) 80-2, the invocation request structure (3) 80-3 and so on.

The operation of the above-described first exemplary embodiment will be described below, beginning with initial setting procedure. The initial setting procedure is performed for each of the inter-device driver communication part (A) 42 and (B) 52, the device driver 41 for OS-A, and the device driver 51 for OS-B.

The initial setting procedure for the inter-device driver communication part (A) 42 and (B) 52 will be described with reference to FIG. 15.

Figure 15:
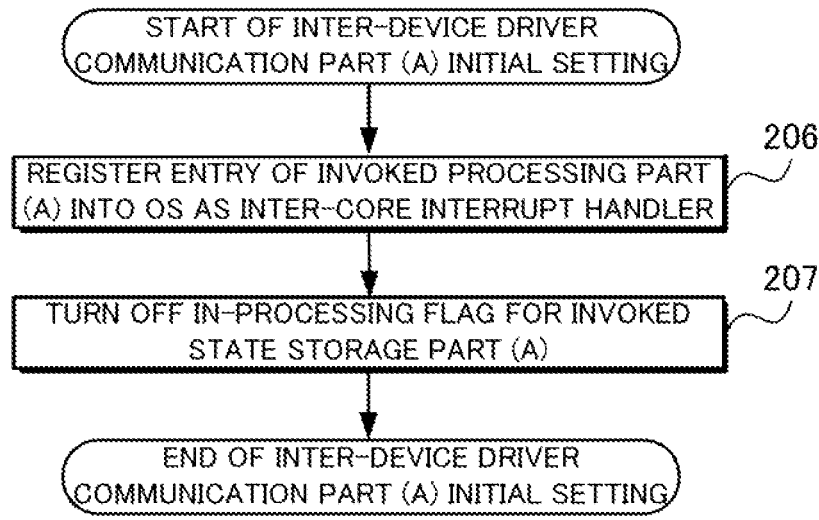
FIG. 15 is a flow chart showing the initial setting procedure for the inter-device driver communication part of OS-A according to the first exemplary embodiment of the present invention.

As shown in FIG. 15, the initial setting for the inter-device driver communication part (A) 42 consists of two steps: step 206 of registering the invoked processing part (A) 425 as an inter-core interrupt handler for the OS, and step 207 of turning off (clearing) the in-processing flag for the invoked state storage part (A) 424. Similarly to the above, the inter-device driver communication part (B) 52 consists of the step of registering the invoked processing part (B) 525 as an inter-core interrupt handler for the OS, and the step of clearing the invoked state (B) 524.

The initial setting procedure for the device driver 41 for OS-A will be described with reference to FIG. 7.

Figure 7:
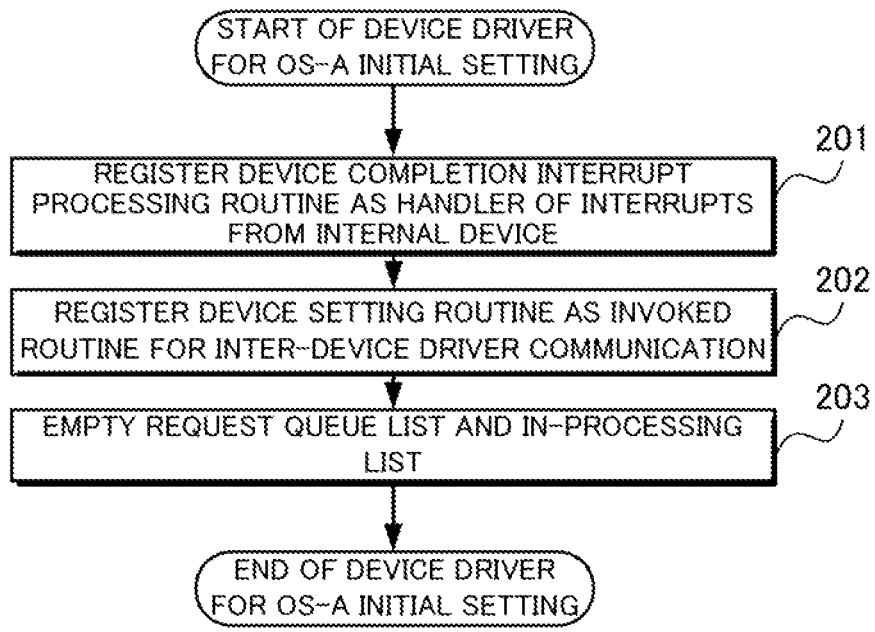
FIG. 7 is a flow chart showing the initial setting procedure for the device driver for OS-A according to the first exemplary embodiment of the present invention.

As shown in FIG. 7, the initial setting procedure for the device driver 41 for OS-A is performed in the following three steps.

First, in step 201, the device completion interrupt processing routine within the device interrupt processing part 452 shown in FIG. 2 is registered as an interrupt handler to handle interrupts from the internal device 14. This processing is performed by use of the function of OS-A 40.

Next, in step 202, the below-described device setting routine is registered as one of the invoked routines for inter-device driver communication by OS-A 40. This registration is performed by invoking the invoked routine registration part (A) 421 of the inter-device driver communication part (A) 42 (FIG. 4).

Finally, in step 203, the request queue list 46 and the in-processing list 47 within the device driver 41 for OS-A are emptied.

The initial setting procedure for the device driver 51 for OS-B will be described with reference to FIG. 8.

Figure 8:
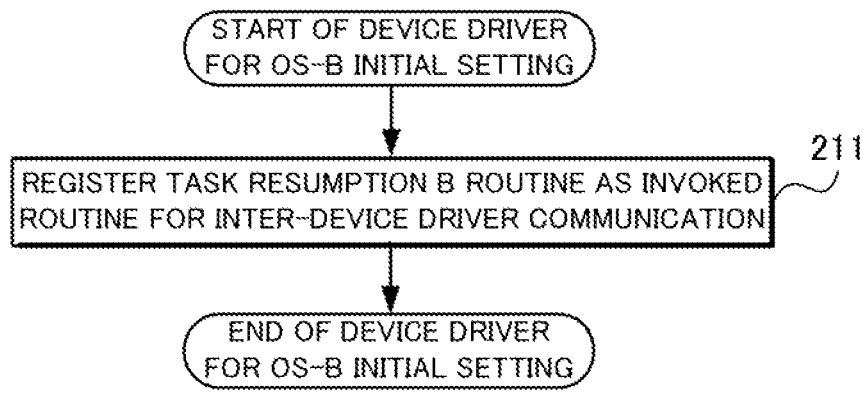
FIG. 8 is a flow chart showing the initial setting procedure for the device driver for OS-B according to the first embodiment of the present invention.

As shown in FIG. 8, the initial setting procedure for the device driver 51 for OS-B consists of the following steps. In step 211, the task resumption B routine to be described below is registered as one of the invoked routines for inter-device driver communication by OS-B 50. This registration is performed by invoking the invoked routine registration part (B) 521 of the inter-device driver communication part (B) 52 (FIG. 4).

This completes the description of the operation of the initial setting procedure. Next, the operation of the task interface part of each device driver will be described.

First, the task interface part (A) 44 on the OS-A 40 side will be described. As described above, the task interface part (A) 44 consists of the request interpretation part (A) 441 and the on-queue task resumption part (A) 442.

Figure 9:
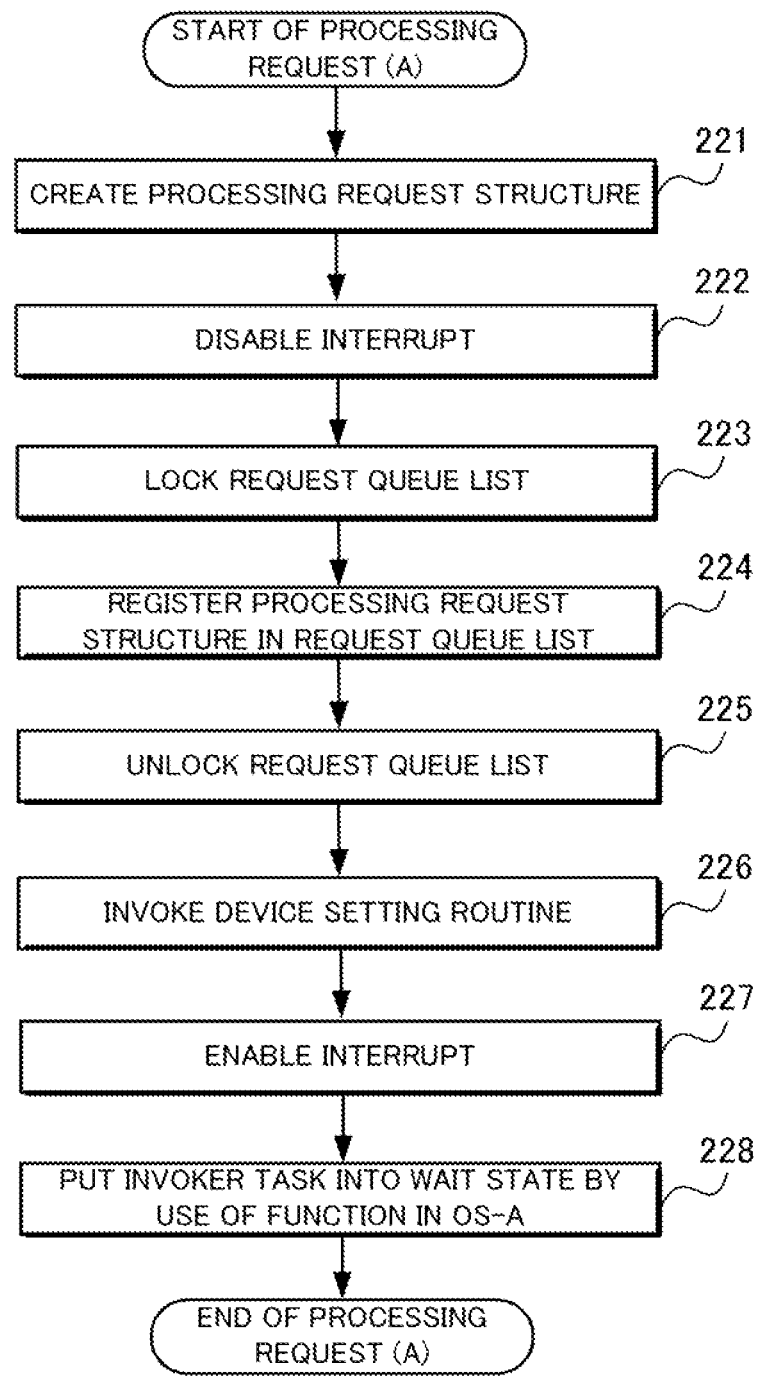
FIG. 9 is a flow chart showing the operation of the request interpretation part of the device driver for OS-A according to the first exemplary embodiment of the present invention.

Upon the receipt of a device access request from the user task 43, the request interpretation part (A) 441 is first invoked. FIG. 9 shows the flow of the processing performed by the request interpretation part (A) 441.

In step 221, the request interpretation part (A) 441 first creates a new instance of the processing request structure 70. The configuration of the processing request structure 70 is as shown in FIG. 3.

In the instance of the processing request structure 70 created in step 221, the processing request identifier field 71 is set to an integer value which is unique within the device driver; the requestor OS identifier field 72 is set to a value representing OS-A; and the requestor task identifier field 73 is set to the task ID of the user task 43 which has submitted the current device access request.

In addition, in the device setting information field 74, the information necessary to identify the operation to be performed by the device interface part (A) 45 of the device driver on the internal device 14, is stored. The information includes the type of the current device access request, the parameters relating to the request and so on. Nothing is set in the device state field 75 at this point in time.

The request interpretation part (A) 441 then registers the instance of the processing request structure created above in the request queue list 46 in the device driver for OS-A. The request queue list 46 is accessed by the task interface part (A) 44 of OS-A, the task interface part (B) 54 of OS-B, and the device interrupt processing part 452 of OS-A. Because of this, as shown in steps 222 through 225 in FIG. 9, the actual registration operation (step 224) takes place within the interval protected by a lock-unlock operation after interrupt is disabled.

The lock-unlock operation is performed by use of, for example, an exclusive control service function provided by the OS or a sequence of instructions created by combining the exclusive control instructions held by the CPU. The lock operation part of the lock-unlock operation is performed using a busy-wait approach. In other words, if an interval is already locked, the lock operation is attempted repeatedly until the lock is established. This exemplary embodiment uses the busy-wait approach because the exclusive control interval is rather short in the exemplary embodiment. As such, even when the exclusive control interval is already occupied for execution, it is expected to be released soon. However, in light of the characteristics of the system, it is possible to choose a form of implementation, wherein step 223 times out after the attempt to acquire lock is made without success for a pre-determined length of time and the processing request in FIG. 9 is then aborted entirely.

Next, in step 226, the request interpretation part (A) 441 invokes the device setting routine, which is a processing stored in the device setting part 451 of the same device driver. The operation of the device setting routine will be described later in more detail. Roughly put, the next processing request structure is retrieved from the request queue list 46 and the internal device 14 is set appropriately according to this processing request structure.

The request interpretation part (A) 441 then enables the interrupt in step 227 and, in step 228, causes the user task (A0) 43 to transition to a wait state (sleep state) by use of a service function in the OS-A.

OS-A suspends the execution of the invoking user task (A0) 43 and switches the task to another executable task, if any. This completes the description of the flow of operation of the request interpretation part (A) 441.

Figure 10:
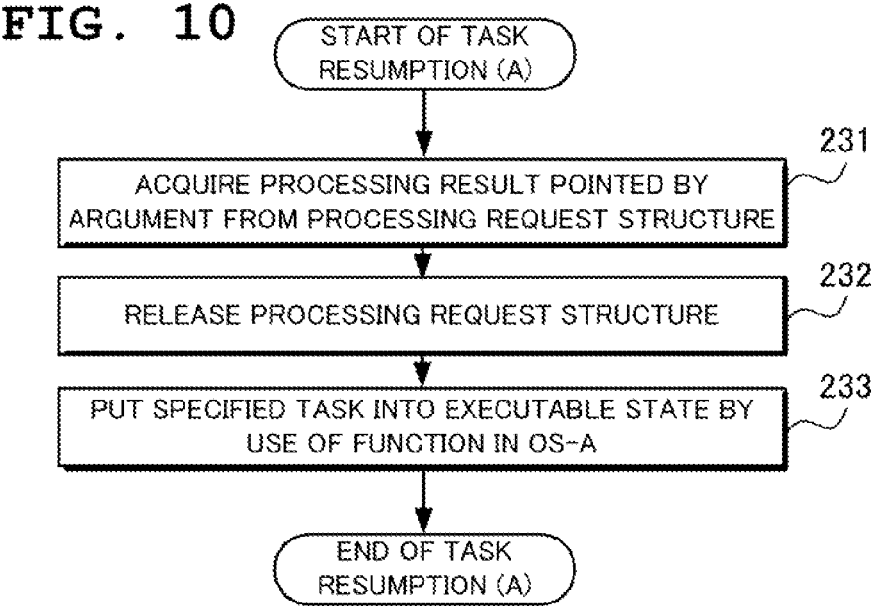
FIG. 10 is a flow chart showing the operation of the on-queue task resumption part of the device driver for OS-A according to the first exemplary embodiment of the present invention.

Upon completion of the processing on the device, the device interrupt processing part 452 stores a processing result of the processing into the device state field 75 of the processing request structure 70, and invokes the on-queue task resumption part (A) 442 of the task interface part (A) 44. The entire processing above will be described later in more detail. Here, the flow of operation of the on-queue task resumption part (A) 442 will be described with reference to FIG. 10.

First, in step 231, the on-queue task resumption part (A) 442 reads the device processing result from the device state field 75 of the processing request structure 70, and copies the device processing result into the pre-determined area in the memory of the invoking user task (A0) 43. In the case of UNIX or other OS in which the OS kernel and user tasks reside in separate logical memory spaces, the copy operation is performed by invoking a service function provided by the OS to perform a copy from the kernel space to the user task space.

Next, in step 232, the on-queue task resumption part (A) 442 releases the memory area for the processing request structure 70 secured in step 221 above, and finally in step 233, causes the user task (A0) 43 to transition to an executable state by use of a service function in OS-A 40.

By this, the user task (A0) 43, whose execution has been suspended in a wait mode for processing by a device, is caused to resume its execution by OS-A 40. This completes the description of the flow of operation of the on-queue task resumption part (A) 442.

Next, the task interface part (B) 54 on the OS-B 50 side will be described. As described above, the task interface part (B) 54 consists of the request interpretation part (B) 541 and the on-queue task resumption part (B) 542. These parts operate similarly to the corresponding parts on the OS-A 40 side, except that the former acts on OS-A for interaction with the request queue list, the in-processing list, and the device interface part.

Figure 11:
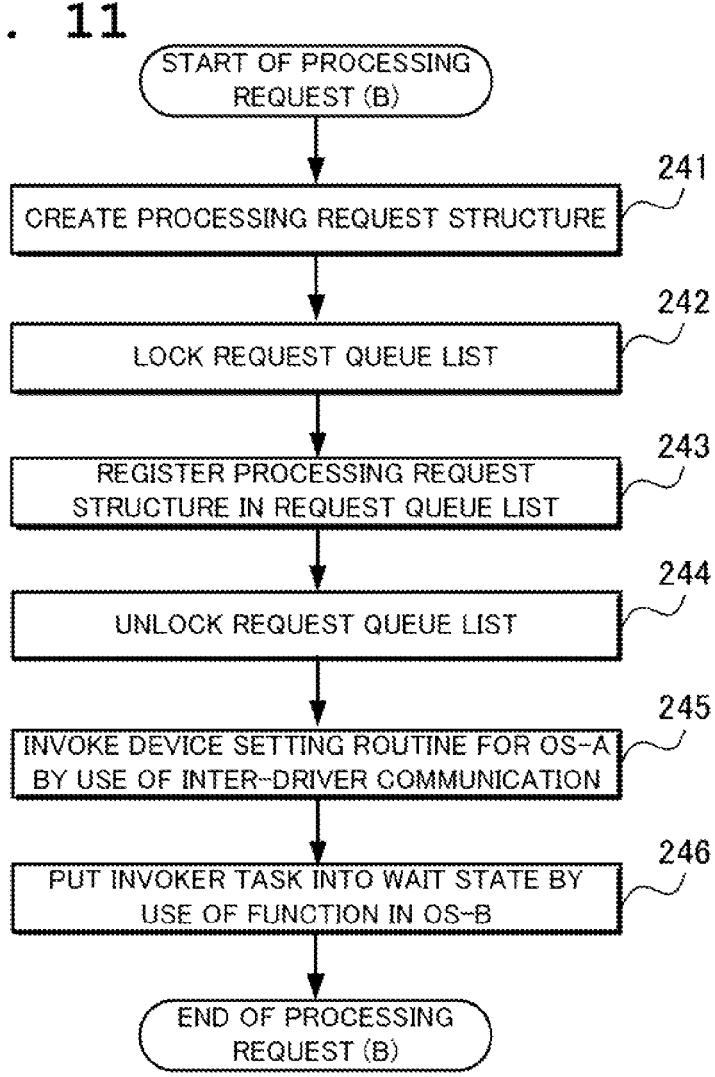
FIG. 11 is a flow chart showing the operation of the request interpretation part of the device driver for OS-B according to the first exemplary embodiment of the present invention.

Upon the receipt of a device access request from the user task (B0) 53 on OS B50, the request interpretation part (B) 541 is first invoked. FIG. 11 shows the flow of the processing performed by the request interpretation part (B) 541.

In step 241, the request interpretation part (B) 541 first creates a new instance of the processing request structure 70. This step operates similarly to step 221, the corresponding step on the OS-A 40 side, except that, in the former step, a value which identifies OS-B 50 is set in the requestor OS identifier field 72.

The request interpretation part (B) 541 then registers the instance of the processing request structure 70 created above in the request queue list 46 in the device driver for OS-A. For inter-OS exclusive control, the actual registration operation is performed in the interval protected by the lock-unlock operation in steps 242 and 244 of FIG. 11 (step 243).

The lock-unlock operation can be implemented in a similar manner to the processings on the OS-A side (steps 223 and 225) shown in FIG. 9. More specifically, the lock-unlock operation is performed by use of, for example, an exclusive control service function or a sequence of instructions created by combining the exclusive control instructions held by the CPU.

In step 245, the request interpretation part (B) 541 then makes a remote call to the device setting routine in the device interface part (A) on the OS-A side, by invoking the inter-device driver communication part (B) 52 by specifying the following parameters:

The invoked OS=OS-A; the invocation routine identifier=the identifier of the device setting routine (as registered in step 202); and the invocation parameter=none.

The operation of the inter-device driver communication part will be described later.

The request interpretation part (B) 541 then, in step 246, causes the user task (B0) 53 to transition to a wait state (sleep state) by use of a service function in the OS-B 50.

In response to this, OS-B 50 suspends the execution of the invoking user task (B0) 53 and switches the task to another executable task, if any. This completes the description of the flow of operation of the request interpretation part (B) 541.

Figure 12:
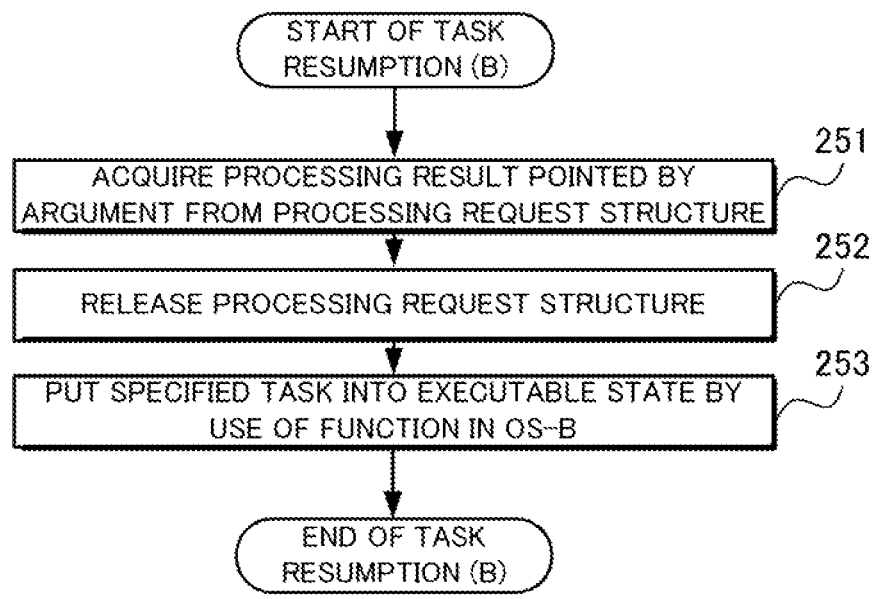
FIG. 12 is a flow chart showing the operation of the on-queue task resumption part of the device driver for OS-B according to the first exemplary embodiment of the present invention.

Upon completion of the processing on the device, an interrupt is activated on the OS-A 40 side. The device interrupt processing part 452 stores a processing result of the device into the device state field 75 of the processing request structure 70, and invokes the on-queue task resumption part (B) 542 of the task interface part (B) 54 by using the processing request structure instance as an argument. The entire processing above will be described later in more detail. Here, the flow of operation of the on-queue task resumption part (B) 542 will be described with reference to FIG. 12.

First, in step 251, the on-queue task resumption part (B) 542 reads the device processing result from the device state field 75 of the processing request structure 70 given as an argument, and copies the device processing result into the pre-determined area in the memory of the invoking user task (B0) 53. In the case of UNIX or other OS in which the OS kernel and user tasks reside in separate logical memory spaces, the copy operation is performed by invoking a service function provided by the OS to perform a copy from the kernel space to the user task space.

Next, in step 252, the on-queue task resumption part (B) 542 releases the memory area for the processing request structure 70 secured in step 241 described above, and finally in step 253, causes the user task (B0) 53 to transition to an executable state by use of a service function in OS-B 50.

By this; the user task (B0) 53, whose execution has been suspended in a wait mode for processing by a device, is caused to resume its execution by OS-B50. This completes the description of the operation of the task interface part of each device driver.

Next, the operation of the device interface part (A) 45, which is uniquely provided in the device driver 41 on the OS-A side, will be described. As described above, the device interface part (A) 45 consists of the device setting part 451 and the device interrupt processing part 452.

Figure 13:
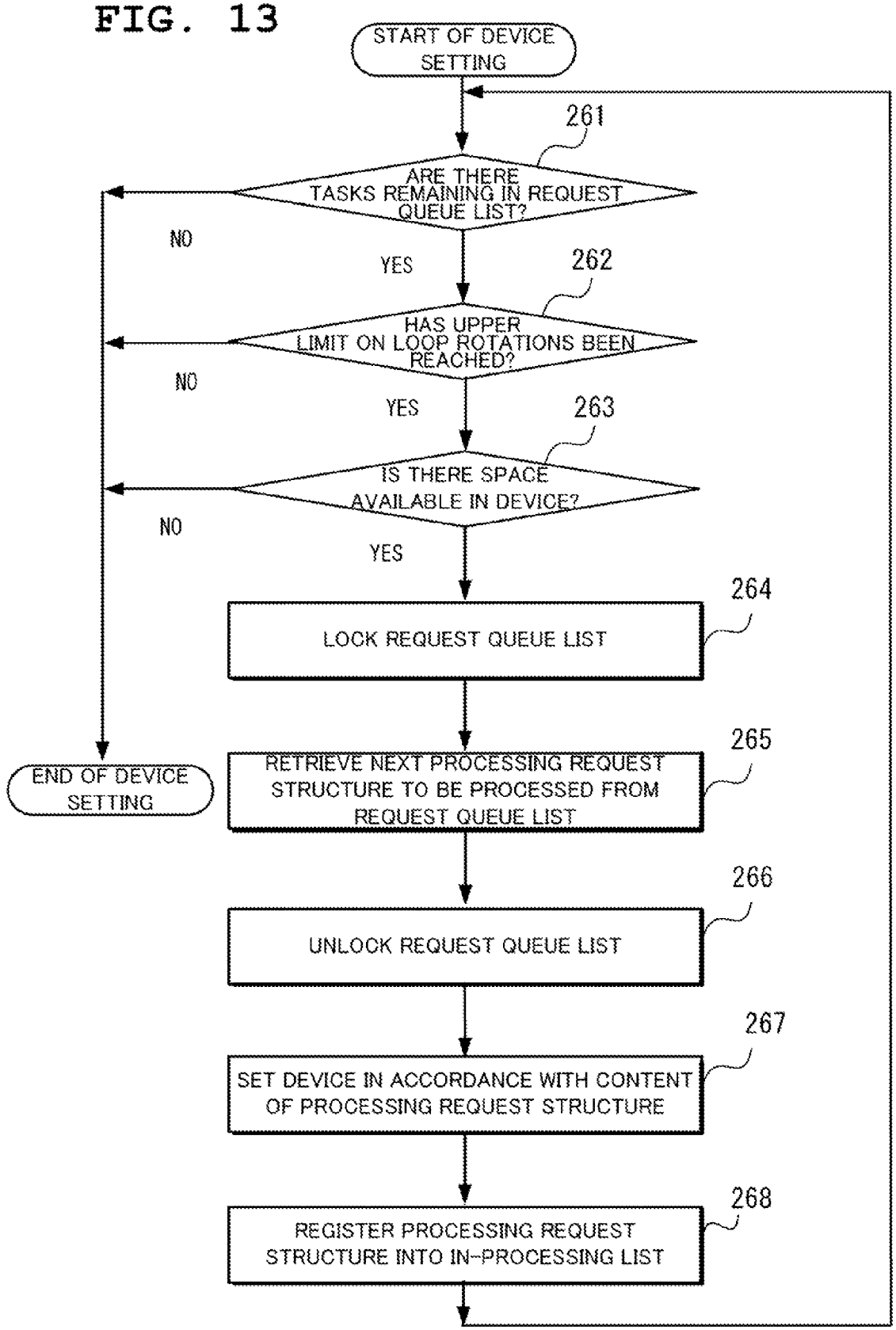
FIG. 13 is a flow chart showing the operation of the device setting part of the device driver for OS-A according to the first exemplary embodiment of the present invention.

With reference to FIG. 13, the flow of operation of the device setting part 451 will be described below. It is expected that the device setting part 451 is invoked in an interrupt disabled state.

In steps 261 through 263, a determination is made as to whether or not any of the conditions for device setting loop continuation is met. The device setting part 451 leaves the loop and terminates the device setting processing, if there are no processing request structures in the request queue list 46, if the number of repetitions during loop continuation has reached the pre-determined upper limit, or if the internal device 14 is already in processing and a new processing cannot be accepted.

The upper limit value is set for the number of repetitions of the loop processing for the purpose of preventing a situation from occurring where other processings (for example, the OS task switching processing and the realtime processing) may be negatively affected by a prolonged interrupt disabled interval caused by many repetitions of the device setting processing.

In cases where the internal device is capable of concurrently accepting the n number of types of processing request, then the upper limit value for loop continuation should be set to "n" or less. In other cases where the internal device is capable of accepting no more than one processing request, then the upper limit value for loop continuation should be fixed at "1."

Based on the concept described above, another exemplary embodiment is possible where an upper limit value is set for the time spent on the device setting processing, rather than for loop continuation. In this case, the flow of operation would be as follows: at the start of the device setting processing, the current time is acquired by use of a timer or other means; in step 262, the current time is acquired again by use of the timer or other means to calculate the length of time lapsed since the start of the processing; and the device setting processing is terminated if the calculated value exceeds the pre-determined upper limit value.

In steps 264 through 266, one instance of the processing request structure is retrieved from the request queue list. The instance is retrieved from all the instances accumulated in the request queue list in accordance with a pre-determined rule. One example of such rule is to retrieve instances in the order of time of arrival (i.e. FIFO).

Since the request queue list is accessed by not only the device setting part but also the task interface parts of OS-A 40 and OS-B 50, the lock-unlock operation for exclusive control needs to be placed before and after the retrieval of an instance. The lock-unlock operation is realized by a call of an exclusive control service function by the OS or a sequence of instructions created by combining the exclusive control instructions held by the CPU. The lock operation is performed using a busy-wait approach. In other words, if an interval is already locked, the lock operation is attempted repeatedly until the lock is established. If a service function in the OS is used, it must be made sure that the function can be safely invoked from an interrupt handler.

In step 267, by referencing the device setting information field 74 of the processing request structure 70, a setting value is written into the internal device 14 to cause the internal device 14 to be transitioned to the intended operation state.

Step 267 is implemented differently from one device to another. For example, in the case of a DMA controller, the processing performed in this step would be as follows: values are written into the source address register, the destination address register, and the transfer size register, and then the relevant bit of the control register is set to start a DMA transfer. Taking a graphic accelerator as another example, in step 267, a sequence of draw commands would be created according to the content of the device setting information field 74 and then the relevant bit of the control register would be set to start the draw process of the graphic accelerator. These processings are similar to those performed by device drivers according to related arts, for example general DMA device drivers and graphic accelerator device drivers, on their respective internal devices.

If the internal device 14 is of a type that accepts more than one processing request, then in step 267, values of the identifier which identify the multiple processings launched in the device would be set in the processing request identifier field 71 of the processing request structure 70, in addition to the above. These identifiers vary from one device to another, and examples thereof include transactions IDs and command queuing ID.

Finally, in step 268, the instance of the processing request structure 70 retrieved in step 265 above is registered in the in-processing list 47. Although the in-processing list 47 is also accessed by the task interface part (A) 44 of OS-A, exclusive control has already been made between the task interface part (A) 44 and the device interface part 45 by the interrupt disabling/enabling operation, so there is no need to separately perform the exclusive control processing before and after step 268.

This completes the description of the flow of operation of the device setting part 451.

Figure 14:
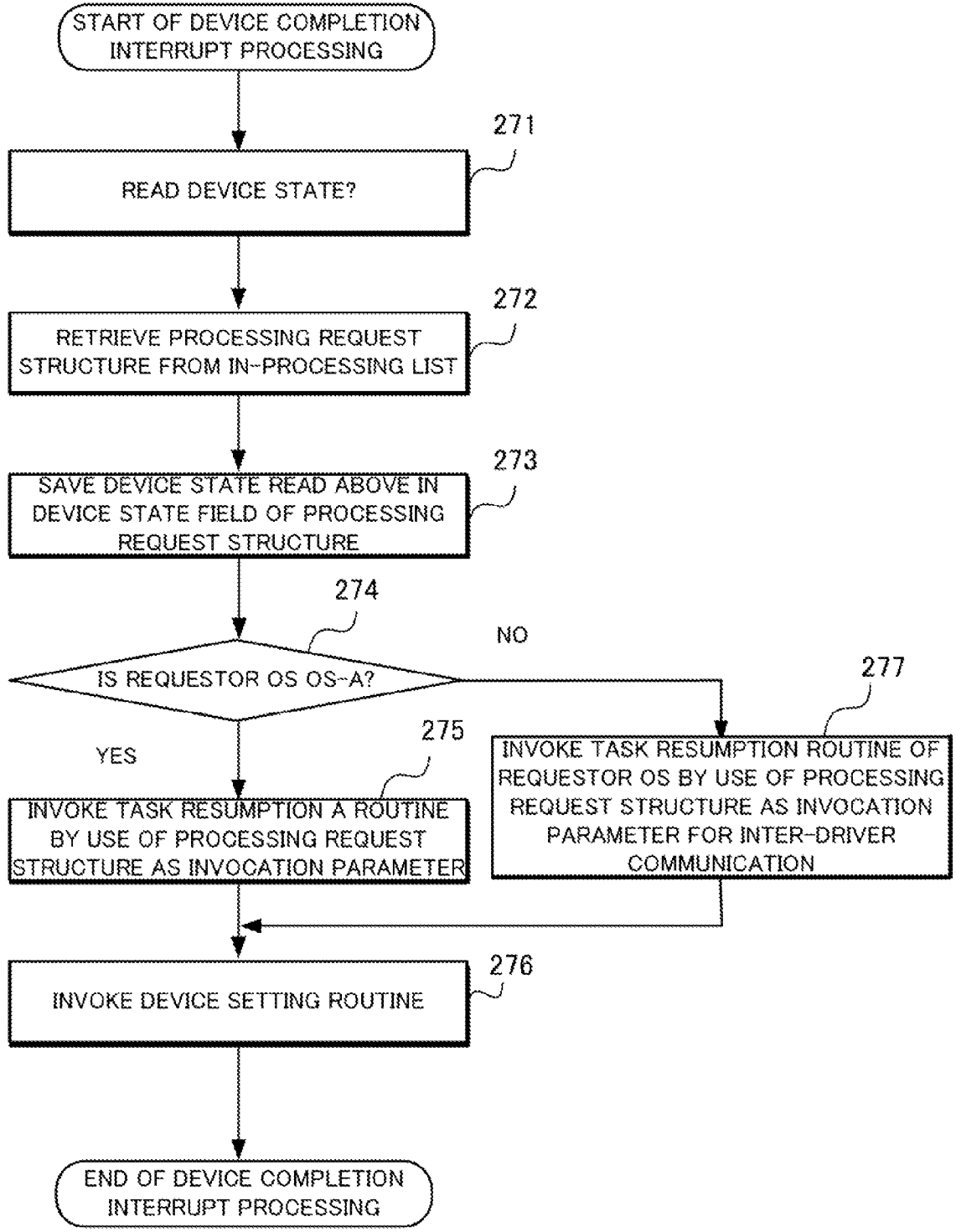
FIG. 14 is a flow chart showing the operation of the device interrupt processing part of the device driver for OS-A according to the first exemplary embodiment of the present invention.

Next, with reference to FIG. 14, the flow of operation of the device interrupt processing part 452 will be described. Since the device interrupt processing part 452 is invoked as a handler to handle interrupts from the internal device to OS-A 40, the entire processing is performed in an interrupt disabled state.

First, in step 271, the device state is promptly read from the internal device 14. This step is necessary for several reasons, including to avoid a situation where the device state unintentionally changes due to completion of a subsequent graphic draw processing, completion of a subsequent disc read processing or other subsequent external events to the device; and to prevent a situation from occurring where a next device processing fails to proceed until the device state is read, which is the case with some devices such as a serial port.

In step 272, an instance of the processing request structure 70 corresponding to the current completion interrupt is retrieved from the in-processing list 47. If the internal device 14 is of a type that accepts more than one processing request, the corresponding instances of the processing request structure 70 are uniquely identified by matching the values set in the processing request identifier field 71 in step 267, against the values on the internal device side.

In step 273, the device state value read in step 271 is stored into the device state field 75 of the processing request structure 70 that has been retrieved in step 272. The state of the internal device after completion of the processing is now saved in the instance of the processing request structure 70.

In step 274, the requester OS is determined by referencing the requestor OS identifier 72 for the instance of the processing request structure.

If the requestor OS is OS-A 40, in step 275, the on-queue task resumption part (A) 442 is invoked by using the instance of the processing request structure 70 as an argument. The flow of the processing on the on-queue task resumption part A is as described for steps 231 through 233 of FIG. 10. This operation causes the invoking user task (A0) 43 on OS-A40, which has been waiting for completion of the processing on the device, to resume its operation.

If the requestor OS is other than OS-A, in step 277, a remote call is made to the on-queue task resumption part of the device interface part on the requestor OS by invoking the inter-device driver communication part (A) 42 by specifying the following parameters:

The invoked OS=the requestor OS; the invocation routine identifier=the identifier of the task resumption routine in the requestor OS (as registered in step 211); and the invocation parameter=the instance of the processing request structure.

This operation causes the invoking user task (in this example, the user task (B0) 53), which has been waiting for completion of the processing on the device on the requester OS, to resume its operation.

Finally, in step 276, the device setting routine incorporated in the device setting part 451 is invoked and the next processing is set on the internal device 14. This part of the operation is as described for steps 261 through 268 of FIG. 13.

This completes the description of the operation of device interface part 45 on the OS-A side.

Next, the flow of operation of the inter-device driver communication part (A) 42, (B) 52, which is provided for direct communicate between device drivers on different OSs. A set of communication represents one-way communication from one device driver to the other. Two-way communication can be realized by using two sets of communication of the same kind. Therefore, the operation of a set of one-way communication will be described below.

The inter-device driver communication part (A) 42, (B) 52 is invoked by the device driver of each OS by specifying three parameters for a remote call: the destination OS; the identifier of the invocation routine to be called on the OS; and the invocation parameters to be passed to the routine.

Figure 16:
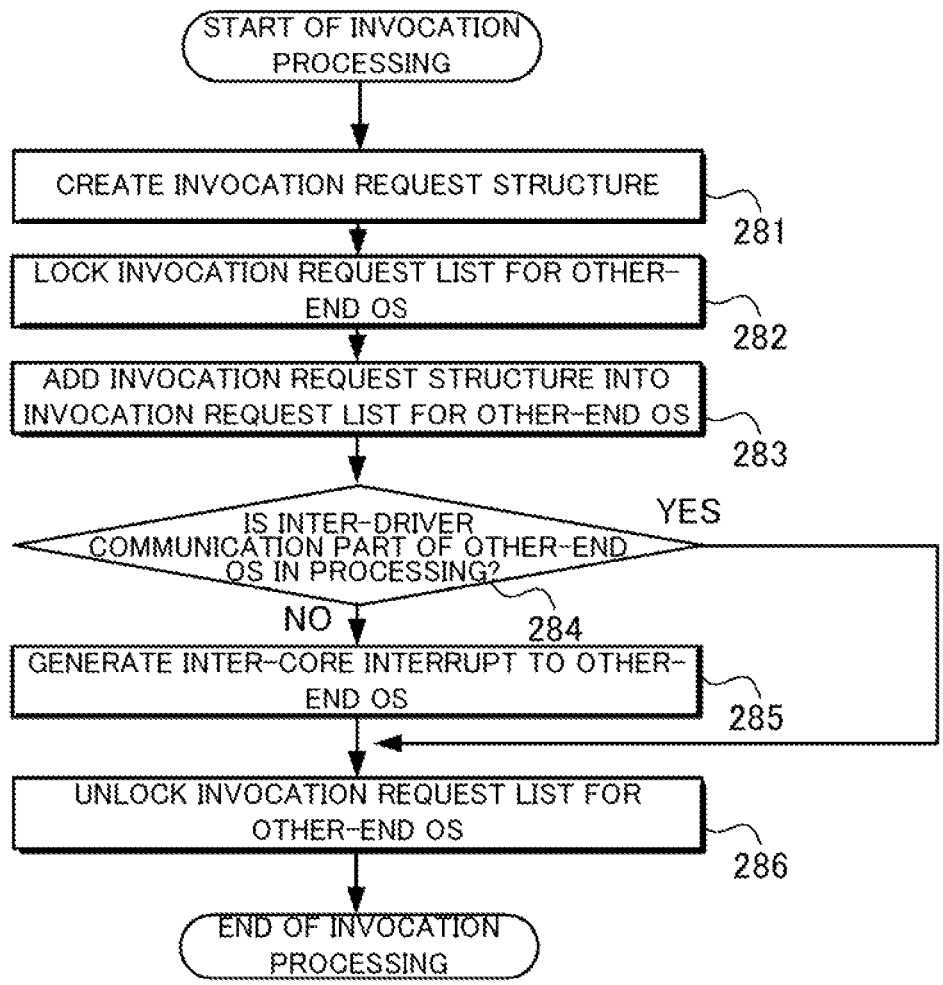
FIG. 16 is a flow chart showing the operation performed by the inter-device driver communication part when invoking the destination OS according to the first exemplary embodiment of the present invention.

As shown in FIG. 16, first in step 281, the inter-device driver communication part (A) 42, (B) 52 creates an instance of invocation request structure 80 shown in FIG. 5 by use of two of the three given parameters, i.e. the invocation routine identifier and the invocation parameter. The value which identifies the requestor OS is set in the requestor OS identifier field 81.

In step 283, the above-mentioned instance of the invocation request structure 80 is added to the invocation request list (A) 423 or (B) 523 in the destination OS to be invoked. Since the invocation request list is also accessed by the destination OS, a lock is acquired for exclusive control in a step immediately prior to step 283, i.e. step 282. The lock acquisition operation is achieved by use of an exclusive control instruction or equivalent service function in the OS provided in the CPU itself.

Figure 4:
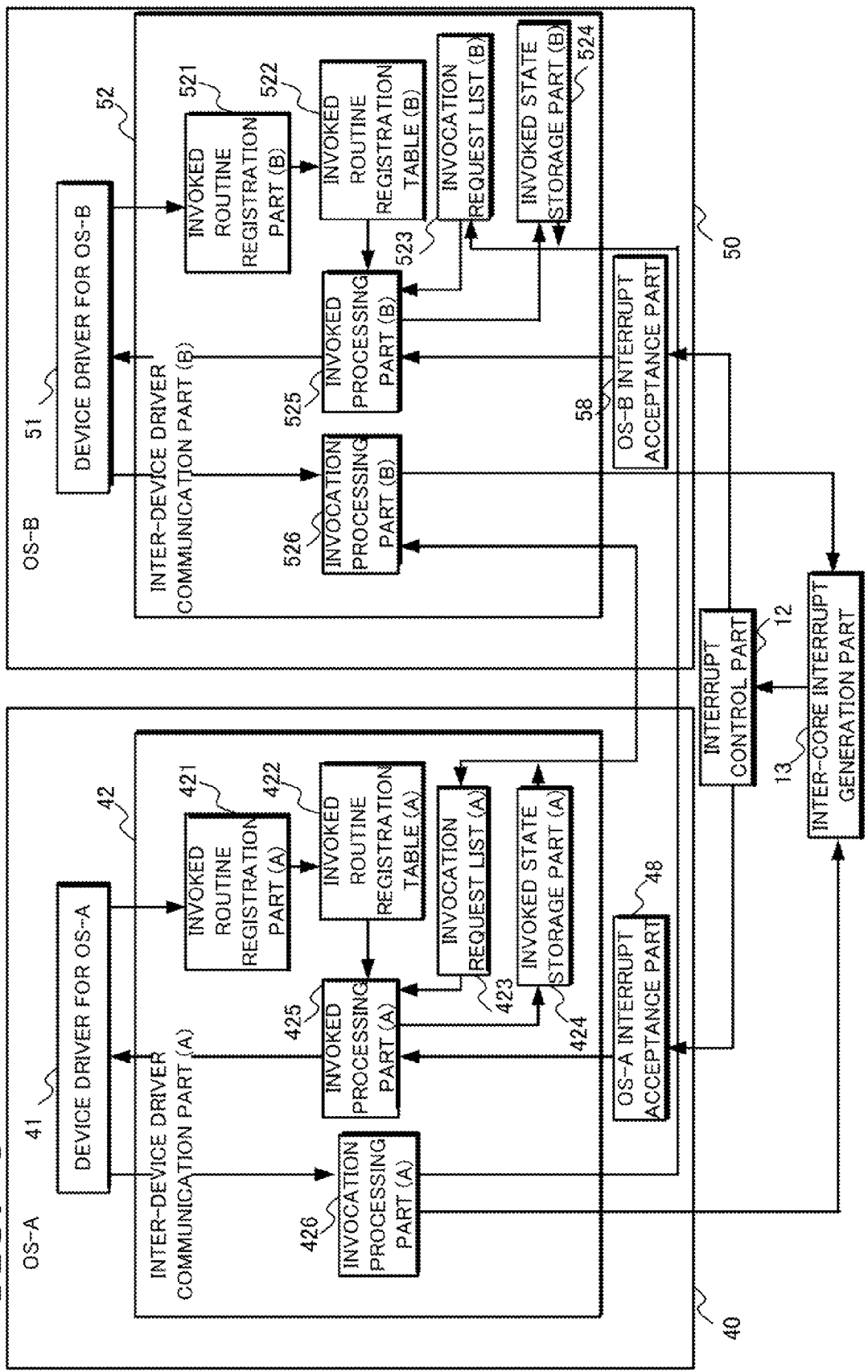
FIG. 4 is a block diagram showing the internal structures of the inter-device driver communication part running on OS-A and OS-B according to the first exemplary embodiment of the present invention.

In step 284, a determination is made as to whether or not the inter-device driver communication part of the destination OS is in processing, by directly referencing the in-processing flag in the invoked state storage part of the device driver communication part of the destination OS (step 424 and 524 of FIG. 4).

If the inter-device driver communication part to communicate with is not in processing, step 285 is performed to generate an inter-core interrupt to the destination OS. This operation is performed by using a hardware manipulation instruction or equivalent service function in the OS to submit a request to the inter-core interrupt generation part 13 for a CPU inter-core interrupt to the CPU core on which the destination OS is running. This causes the other-end inter-device driver communication part to begin processing the new requests accumulated in the invocation request list 423, 523. The flow of this operation will be described below.

If the other inter-device driver communication part is in processing, the request added to the invocation request list 423, 523 in step 283 will be processed in due time, so step 285 is simply skipped to proceed to the next step.

In step 286, the lock acquired in step 282 is unlocked and the exclusive control interval is exited.

Figure 17:
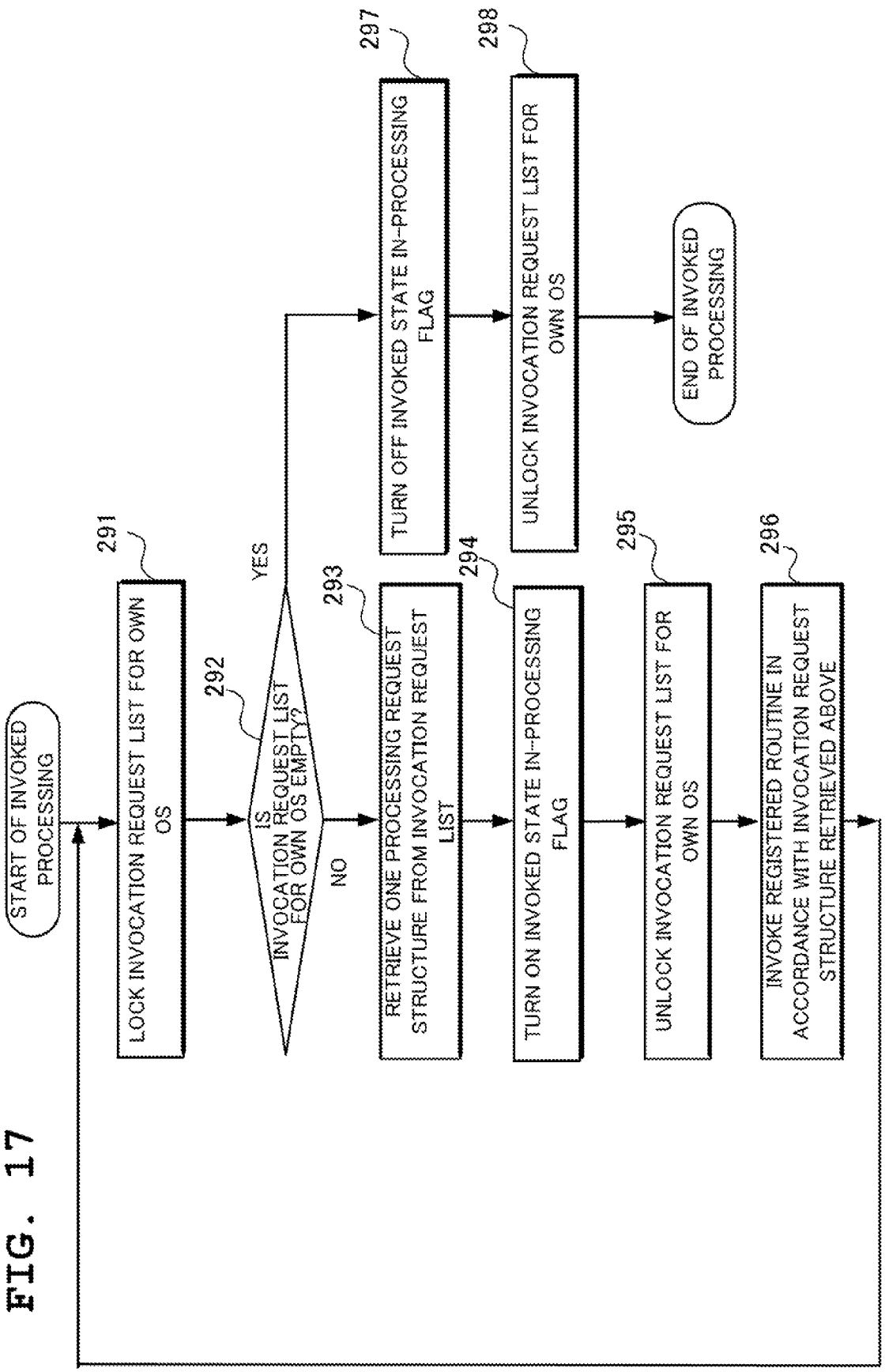
FIG. 17 is a flow chart showing the operation of an invoked processing performed by the inter-device driver communication part upon invocation by the destination OS according to the first exemplary embodiment of the present invention.

If an inter-core interrupt to the destination OS is caused to take place in step 285, the invoked processing part set in step 206 of FIG. 15 is invoked on the destination OS. The flow of operation of the invoked processing part will be described below, with reference to FIG. 17. In the description of the invoked processing part below, the destination OS, i.e. the OS on the invoked side, will be referred to as "own OS."

In step 292, the invoked processing part 425, 525 checks the invocation request list 423, 523 in own OS. If the list is empty, in step 297, it turns off the in-processing flag in the invoked state storage part (424 or 524 of FIG. 4) (in other words, sets the flag to "not in-processing") and terminates the processing by the invoked processing part 425, 525 entirely.

If the invocation request list 423, 523 is not empty, in step 293, the invoked processing part 425, 525 retrieves one instance of the invocation request structure 80 from the start of the invocation request list 423, 523. It then, in step 294, turns on the in-processing flag (to indicate an "in-processing" state) in the invoked state storage part (424 or 524 of FIG. 4) and, in step 296, invokes a previously registered routine. Since the invocation request list (423 or 523 of FIG. 4) may be possibly accessed by the invoking inter-device driver communication part, steps 292 through 294 and step 297 are protected by exclusive control based on the lock-unlock operation. The lock acquisition operation is achieved by use of an exclusive control instruction or equivalent service function in the OS provided in the CPU itself.

Returning to the description of step 296, the routine to be invoked is determined by searching through the invoked routine registration table (422 or 522 of FIG. 4) in own OS, using as a key the invocation routine identifier field 82 of the invocation request structure 80. Then, the invoked routine is invoked by use of the value stored in the invocation parameter field 83 of the invocation request structure 80 as the argument for the routine.

This completes the description of the flow of processing of the inter-device driver communication part.

To help better understanding of the invention, a detailed description of device access from tasks on OS-A 40 and that from tasks on OS-B 50 will be given below with reference to the drawing showing the flow of processing of each part sequentially.

Figure 18:
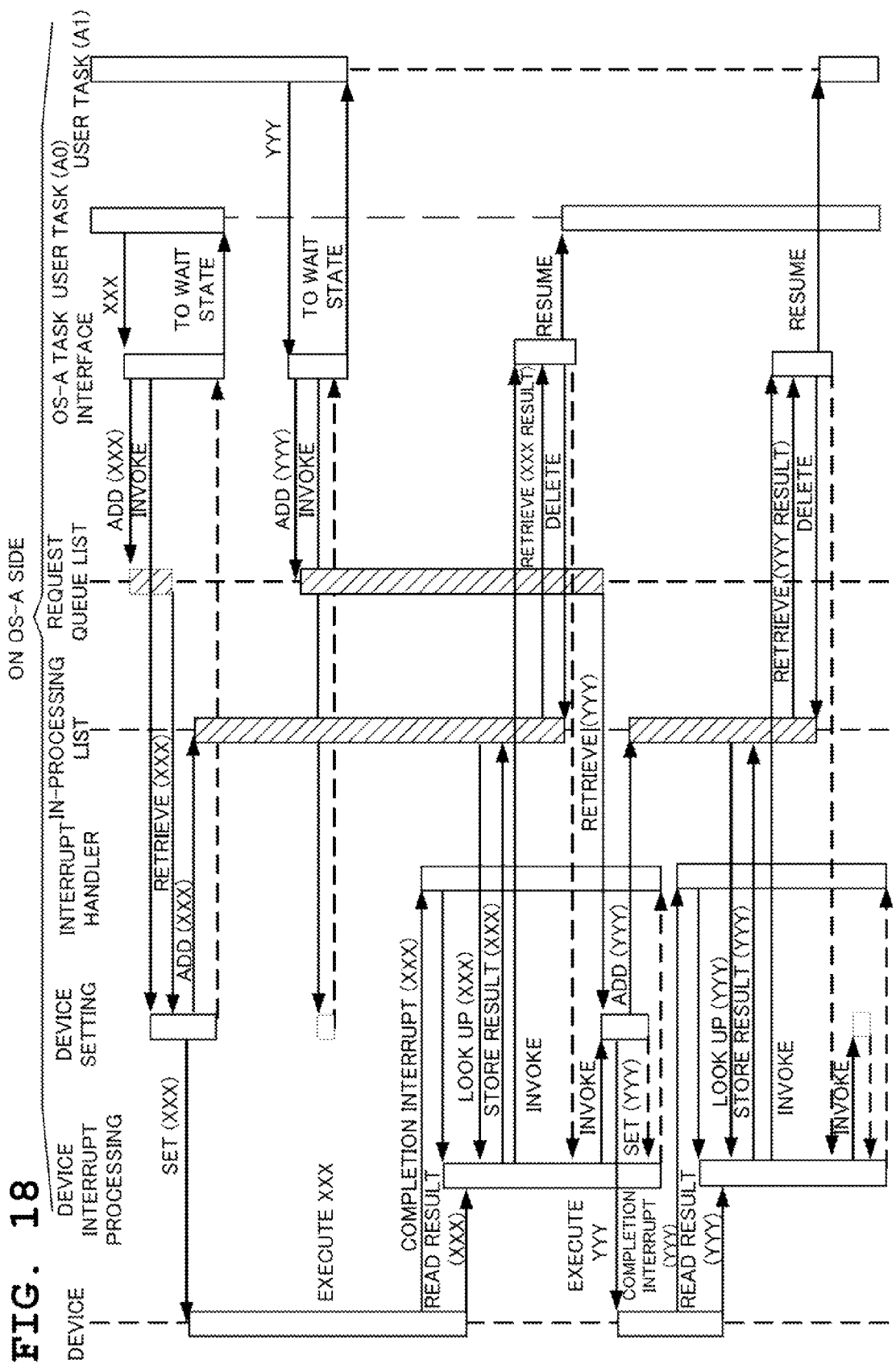
FIG. 18 is a diagram showing the entire processing flow performed when a user task running on OS-A accesses a device according to the first exemplary embodiment of the present invention.

FIG. 18 shows how two tasks running on OS-A 40, i.e. user task (A0) and user task (A1), access a device for shared use. In FIG. 18, time flows from top to bottom. A vertically slender rectangular represents the period during which the corresponding task or component part is operating. A vertically slender rectangular with diagonal hatching lines indicates that data (an instance) exists in the corresponding component part. A horizontal solid line arrow represents a call or interrupt to the corresponding routine. A dotted line arrow represents a return of the corresponding routine from processing.

Looking at the upper right of FIG. 18, one can see that the user task (A0) has submitted a request for processing "XXX" by a device. The processing request reaches from the task interface part (A) 44 on OS-A 40 directly to the device setting part 451. The device setting part 451 sets the internal device 14 and the processing "XXX" starts. If a request for a processing "YYY" is submitted by another user task (A1) before the processing "XXX" is completed, the requests reaches the device setting part 451 but the processing request structure 70 stays in the request queue list 46 because the internal device 14 is in the midst of processing "XXX." In any case, the user task (A0) and the user task (A1), which are invoker tasks, are caused to be in a wait state on OS-A 40.

Upon completion of the processing "XXX" by the internal device 14, an interrupt is submitted to OS-A 40, and the interrupt handler of OS-A 40 invokes the device interrupt processing part 452.

The device interrupt processing part 452 first stores a processing result of the processing "XXX" by the internal device 14 in the in-processing list 47, and then invokes the on-queue task resumption part (A) 442 of the OS-A task interface part (A) 44.

After reading the in-processing list 47 to acquire the processing result, the on-queue task resumption part (A) 442 resumes the user task A0, which has been in a wait state. The device interrupt processing part 452 further invokes the device setting part 451 to retrieve the next processing "YYY," which has been waiting on the request queue list 46, and to set the processing "YYY" in the internal device 14.

Then, when the internal device 14 completes the processing "YYY," a completion interrupt is submitted to OS-A 40 similarly to the above. After the device interrupt processing part 452 stores the processing result in the in-processing list 47 once, the on-queue task resumption part (A) 442 of the task interface part (A) 44 causes the user task (A1) to resume its operation.

Next, with reference to FIG. 19, a description will be made as to cases where another OS, which is not the OS performing device operation, issues a device access request. In this description, it is assumed that two tasks on OS-B 50, i.e. user task (B0) and user task (B1), are to access devices via the OS-A 40 side.

Figure 19:
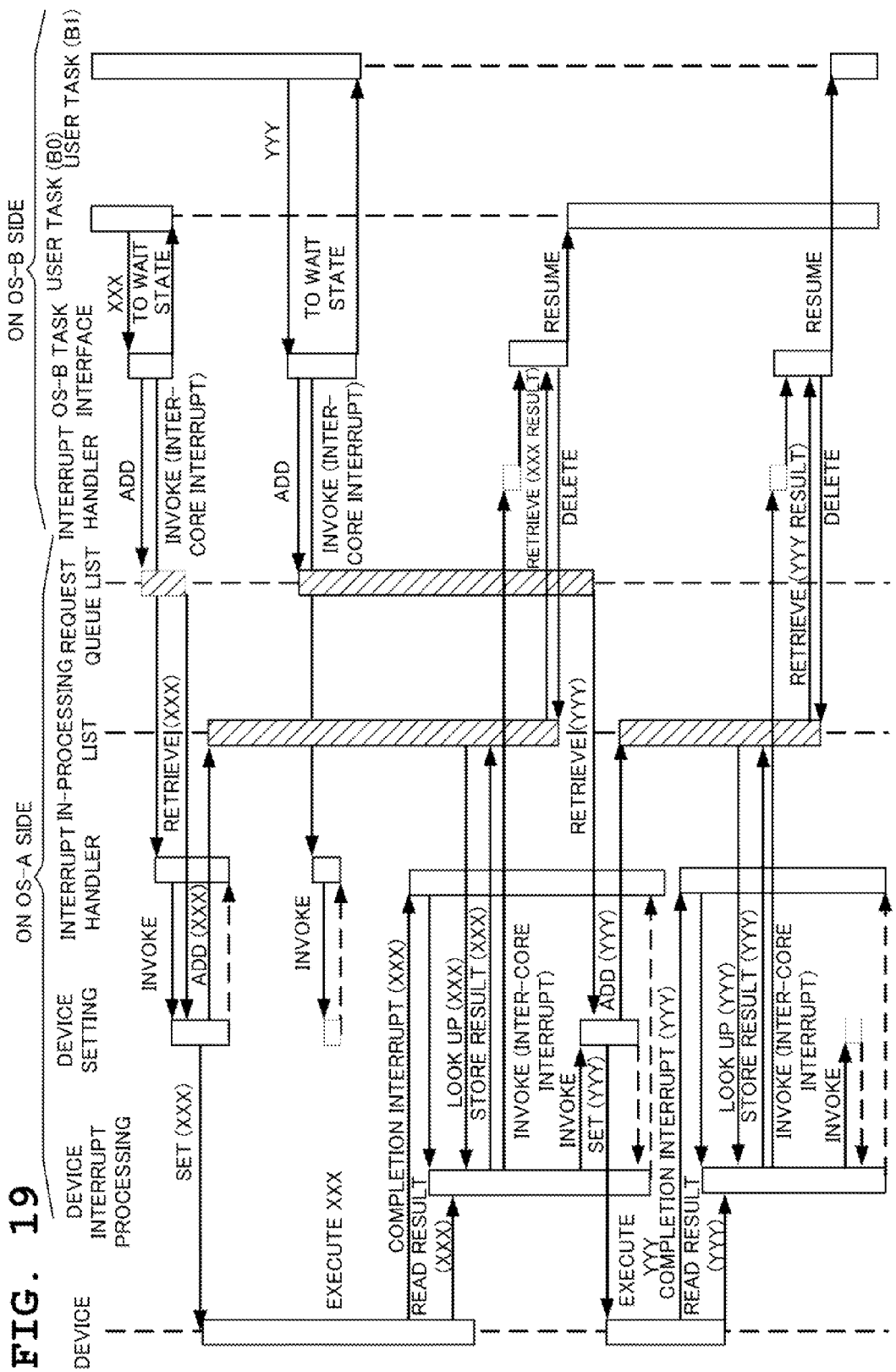
FIG. 19 is a diagram showing the entire processing flow performed when a user task running on OS-B accesses a device according to the first exemplary embodiment of the present invention.

As shown in the upper right of FIG. 19, the user task (B0) and the user task (B1) have issued device access requests "XXX" and "YYY," respectively. These requests are first accepted by the task interface part (B) 54 on the OS-B 50 side, and then transferred to the device setting part 451 on the OS-A 40 side via the inter-device driver communication part (B) 52, (A) 42.

To achieve this process, within the inter-device driver communication part (B) 52, (A) 42, a CPU inter-core interrupt generated by the inter-core interrupt generation part 13 is used and the device setting part 451 is invoked from the interrupt handler on the OS-A 40 side. The part of the process where the device setting part 451 performs setting on an internal device 14 is the same as FIG. 18.

Upon completion of the processing "XXX" by the internal device 14, an interrupt is sent to OS-A 40 and the device interrupt processing part 452 performs a device completion interrupt processing, as is the case with FIG. 18. The device interrupt processing part 452 checks the requestor OS identifier in the processing request structure and become aware that the invoker task is OS-B 50. It then uses the inter-device driver communication part (A) 42, (B) 52 to invoke the task interface part (B) 54 on the OS-B 50 side.

To achieve this process, within the inter-device driver communication part (A) 42, (B) 52, a CPU inter-core interrupt generated by the inter-core interrupt generation part 13 is used and the on-queue task resumption part (B) 542 is invoked from the interrupt handler on the OS-B 50 side.

The part of this process where the on-queue task resumption part (B) 542 of the task interface part B resumes the user task is the same as FIG. 18.

According to the first exemplary embodiment, it becomes possible to improve the performance of device access from tasks on OS-B 50, which is the client side of this system. This is because the amount of data exchange is reduced by using a high-speed communication means between device drivers for inter-OS communication and by designing such that each of the device drivers directly accesses the data structure within the other device driver.

In addition, the cost required for developing software for sharing devices can be kept low. This is because the necessity of modification of functions for support of inter-OS (client-server) communication is minimized by adopting an approach where communication is performed by and between device drivers placed at the lowest tier in the software layer in which only a small number of basic functions are implemented.

According to this exemplary embodiment, kernel-level communication based on inter-device driver communication is used for data exchange between a server and a client (i.e. OS-A 40 and OS-B 50), without being routed through a separate proxy task. In addition, the device driver 51 of OS-B 50 (client side) directly accesses the request queue list 46 and the in-processing list 47 within the device driver 41 of OS-A 40 (server side).

In general, in the software layer, the higher the tier is, the greater number of types of APIs the layer tends to comprise. This is because the functions at a higher tier are usually established by combining the functions at a lower tier or by increasing the variations of such functions for greater ease of use. In an opposite manner, a device driver placed at the lowest tier has only a few types of functions, such as open, close, read and write. In this exemplary embodiment, the amount of modification necessary to enable communication between device drivers is minimized by using the lowest-tier inter-device driver communication.

Next, the second exemplary embodiment of the present invention will be described.

Figure 20:
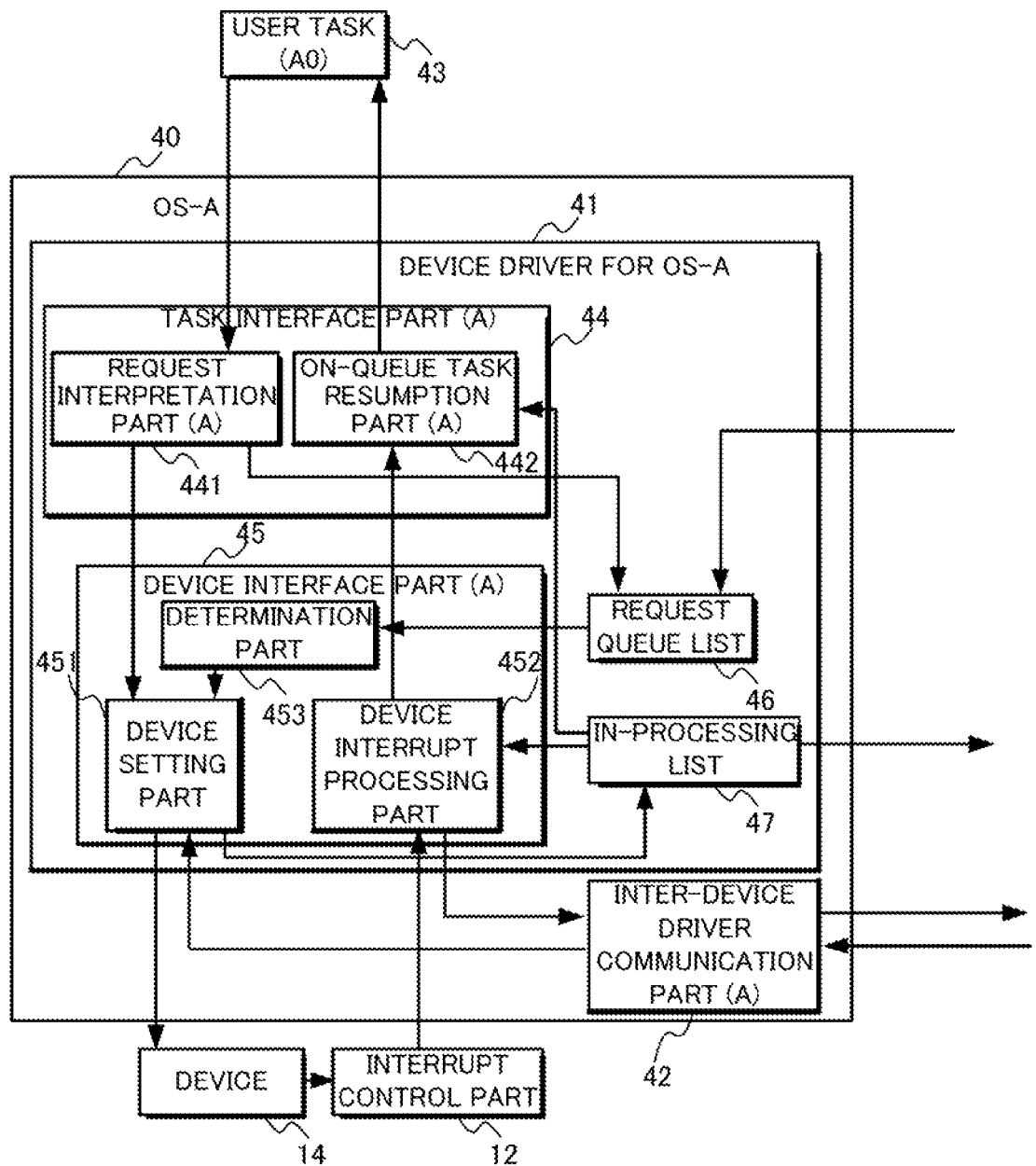
FIG. 20 is a diagram showing how the device driver and the determination part therein are positioned according to the second exemplary embodiment of the present invention.

As shown in FIG. 20, the second exemplary embodiment is characteristic in that it additionally comprises a determination part 453 in the device interface part (A) 45. The remaining part of the second exemplary embodiment is the same as the first exemplary embodiment described above.

The determination part 453 has a function to determine weather to accept or reject each of one or more instances of the processing request structure 70 that are accumulated in the request queue list 46 in accordance with a pre-determined rule or a function to select a next instance to be processed in accordance with a pre-determined rule.

An instance of the processing request structure 70 determined by the determination part 453 to be accepted or an instance of the processing request structure 70 selected by the determination part 453 as the next instance to be processed is passed to the device setting part 451.

More specifically, it is possible to configure the determination part 453 such that, among the instances of the processing request structure 70 in the request queue list 46, it discards any instances requested by an OS other than the pre-specified OS (e.g. OS-A 40), or that it discards any instances requested by the pre-specified OS-task pair (e.g. task #2 on OS-B 50, task #4 on OS-B 50, and so on).

The introduction of the determination part 453 that functions as described above creates a new effect that access control on internal devices at the OS-task level is enabled.

In another example, the determination part 453 may be configured such that, when selecting one from the instances of the processing request structure 70 in the request queue list 46, it gives priority to an instance with a requestor OS value that is different from the requestor OS value held by the instance selected at the previous determination, or that it always selects an instance requested by the pre-specified OS-task pair (e.g. task #3 on OS-B), if any.

By introducing the determination part 453 that functions as described above, a new effect is achieved that fair scheduling over OSs issuing access requests to internal devices can be implemented. Moreover, another new effect is realized in relation to device resource scheduling that particular OS-task pairs can be given preferential device access rights.

Next, the third exemplary embodiment of the invention will be described.

Figure 21:
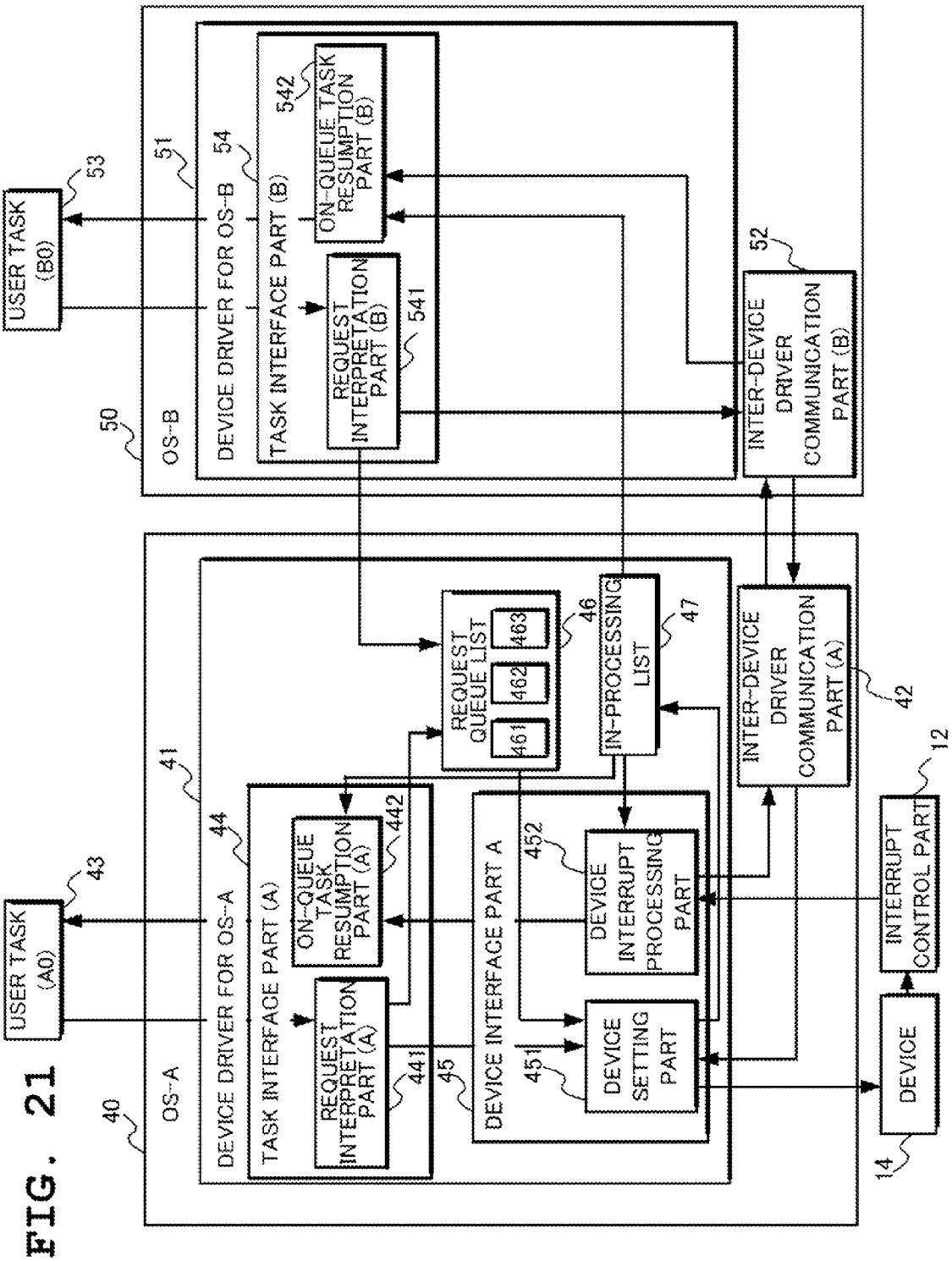
FIG. 21 is a diagram showing how the device driver and the request queue list therein are configured according to the third exemplary embodiment of the present invention.

With reference to FIG. 21, the third exemplary embodiment is characteristic in that the request queue list 46 in OS-A 40 comprises two or more lists for difference purposes. The remaining part of the third exemplary embodiment is the same as the first exemplary embodiment.

In the third exemplary embodiment, each of the internal lists within the request queue list 46 is associated with a particular OS.

More specifically, the list 461 and the list 462 are associated with OS-A 40 and OS-B 50, respectively. The list 463 is not used in this example, because there are only two OSs.

The request interpretation part (441 and 541 of FIG. 21) of each OS places instances of the processing request structure 70 into the list associated with that OS. The device setting part 451 looks up the lists in accordance with a pre-determined rule (for example, look up the lists in turn), and retrieves an instance of the processing request structure 70 for processing. The task interface part and the device interface part perform the lock-unlock operation for exclusive control for each of the lists 461 to 463 in the request queue list 46.

According to the third exemplary embodiment described above, the probability is lower that a collision, and a consequent wait state, occur when acquiring a lock, compared to the first exemplary embodiment of the present invention, because the lock-unlock operation on a request queue list is performed on an OS-to-OS basis. This leads to an effect of reducing performance overhead for device access. This effect is particularly significant in cases where small-sized access requests are highly frequently issued to internal devices.

As a variation example of the third exemplary embodiment, the lists within the request queue list 46 described above may be configured such that they are associated with different priorities.

For example, the list 461 in the request queue list 46 may be associated with a highest priority, the list 462 with a moderate priority, and the list 463 with a lowest priority. By this, for example, it becomes possible for the device setting part 451 to first reference the list 461 twice, then to reference the list 462 once, and finally to retrieve and process the instance of the processing request structure 70 that has been found at the first reference. The device setting part 451 will reference the list 463 only if both the lists 461 and 462 are empty.

According to the variation example of the third exemplary embodiment described above, the device setting part 451 can perform access priority control over internal devices by referencing the lists 461 to 463 in accordance with a simple rule based on the number of times of reference. This leads to an effect that access priority control over internal devices can be realized easily and at a low CPU overhead.

The invention may be structured by combining the second and third exemplary embodiments described above. One possible example of such structure is one in which a list dedicated to a particular OS is provided in the request queue list 46 and the determination part 453 is caused to check up the list for a determination to accept or reject a requestor task. By using this structure, it becomes possible to build an inter-OS device sharing mechanism that supports an access control function for each of the OS-task pairs, while keeping performance overhead low.

Next, the fourth exemplary embodiment of the present invention will be described.

Figure 22:
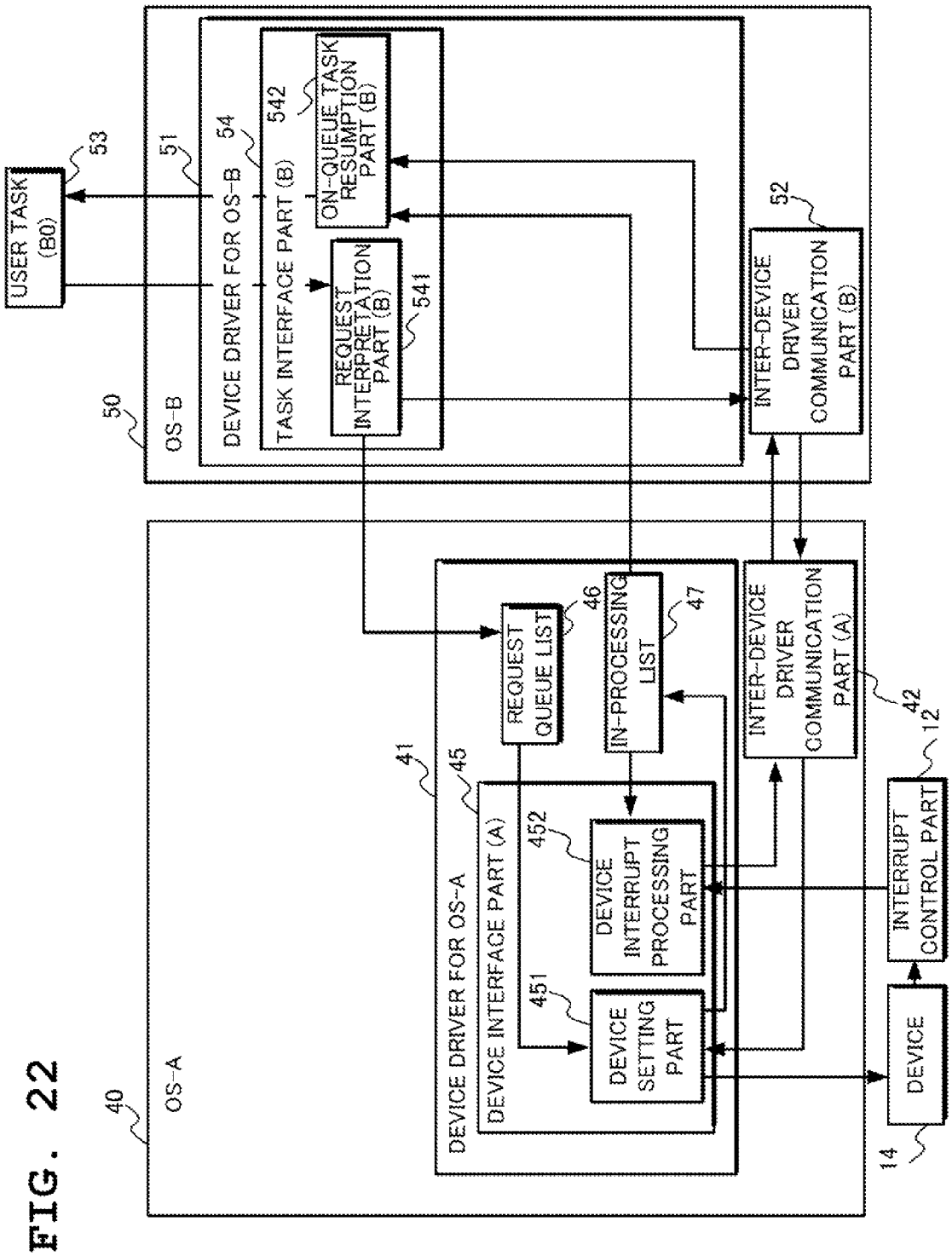
FIG. 22 is a diagram showing the internal structures of device drivers running on OS-A and OS-B according to the fourth exemplary embodiment of the invention.

As shown in FIG. 22, the fourth exemplary embodiment is characteristic in that it comprises the device interface part only, rather than also comprising the task interface part in OS-A 40. The remaining part of the fourth exemplary embodiment is the same as the first exemplary embodiment.

According to the fourth exemplary embodiment, OS-A 40 has no user tasks that access an internal device residing thereon, but devotes itself to control and management of internal devices.

This brings about an effect that OS-A 40 can perform realtime control of internal devices more easily. The effect is particularly significant in cases where an OS that is suitable for realtime processing, for example, a realtime OS such as T-Kernel, is used as OS-A 40.

Moreover, by using as OS-B 50 an OS that has highly sophisticated functions for applications, such as UNIX and Windows, in addition to using a realtime OS as OS-A 40, another effect can be realized that realtime capabilities for device control and an extensive array of functions for applications can be realized in one multi-core processor.

While the invention has been described by taking preferred exemplary embodiments and examples, it should be appreciated that the invention is not limited to such exemplary embodiments and examples but can be embodied with a variety of modifications without departing from the spirit and scope of its technical principle.

INCORPORATION BY REFERENCE

This application is the National Phase of PCT/JP2009/053236, filed Feb. 24, 2009, which is based upon and claims the benefit of priority from Japanese patent application No. 2008-060804, filed on Mar. 11, 2008, the disclosure of which is incorporated herein in its entirety by reference.

The invention can be applied to product fields that require a plurality of OSs to run on a multi-core processor to meet a wide variety of operation requests. Examples of products that the invention may be effectively applied include: mobile terminals that perform wireless network processing and user application processing; home information appliances that perform broadcast reception, video media processing and user interface processing; car-mounted equipment that has combined capabilities for powertrain-, body- and information media-oriented processings; and robot-based equipment that performs mechatronics control, artificial intelligence processing and man/machine interface processing.

What is claimed is:

1. A multiprocessor system comprising:
a multi-core processor;
a plurality of Operating Systems (OSs) running on the multi-core processor, wherein each of said plurality of OSs having a device driver which accesses a device shared among said plurality of OSs
a first device driver on one of said plurality of OSs comprises a device interface part which accesses the device to be operated, a first task interface part which receives a device access request from a task running on said one of said plurality of OSs and returns a device access result to said task, a request queue list which holds processing request data including information concerning the device access request to said device interface part, and an in-processing list which holds said processing request data corresponding to the device access request for which said device interface part is currently processing by accessing the device to be operated;
a second device driver on a second one of said plurality of OSs has the same functions as said first task interface part of said first device driver on said one of said plurality of OSs and comprises a second task interface part which performs inter-operating system (OS) communication with said device interface part;
said second task interface part creates said processing request data in accordance with the device access request from a requestor task on the second one of said plurality of OSs, adds said processing request data to said request queue list, and notifies said device interface part;

said device interface part retrieves one of said processing request data from said request queue list, registers said one of said processing request data into said in-processing list, sets the device to be operated in accordance with the content of the processing request data, and causes the device to operate;
upon completion of the operation of said device, said device interface part stores a processing result for said device into the processing request data in said in-processing list, and notifies said second task interface part; and
upon receipt of the notification from said device interface part, said second task interface part retrieves said processing request data from said in-processing list, references the content of said processing request data, and returns the processing result for said device to the requestor task.

2. The multiprocessor system of claim 1, wherein
said one of said plurality of OSs further comprises an inter-device driver communication part which performs said inter-OS communication;
said inter-device driver communication part has an invoked routine registration part, an invoked processing part which invokes an invoked routine registered in said one of said plurality of OSs, and an invocation processing part which notifies said second one of said plurality of OSs;
said invocation processing part notifies the invoked processing part of said one of said plurality of OSs of an identifier of the invoked routine and an argument to be passed to the invoked routine by an inter-OS shared memory area and an inter-processor interrupt mechanism;
the said second one of said plurality of OSs invokes said invoked processing part within a handler of inter-processor interrupts; and
said invoked processing part invokes the registered invoked routine based on the identifier and argument of said invoked routine notified by said invocation processing part.

3. The multiprocessor system of claim 1, wherein said device interface part determines the order of a plurality of device access requests for the device to be operated, based on the priorities of the device access requests sent from the first or second task interface parts.

4. The multiprocessor system of claim 1, wherein said device interface part comprises a determination part which determines whether access to the device to be operated should be permitted, based on identification information for the second one of said plurality of OSs on which said second device driver is running and identification information of the requestor task for each device access request.

5. The multiprocessor system of claim 1, wherein said request queue list further consists of a plurality of lists each of which is associated with each of said plurality of OSs.

6. The multiprocessor system of claim 1, wherein said request queue list further consists of a plurality of lists in which different priorities are set, and when said retrieving said one of said processing request data from said request queue list, said device interface part retrieves said one of said processing request data based on the priority in one of said plurality of lists.

7. A device driver system comprising:
a multi-core processor;
a plurality of Operating Systems (OSs) running on the multi-core processor, wherein each of said plurality of OSs having a device driver that accesses devices for shared use among said plurality of OSs a first device driver on one of said plurality of OSs comprises a device interface part which accesses a device to be operated, a first task interface part which receives a device access request from a task running on said one of said plurality of OSs and returns a device access result to said task, a request queue list which holds processing request data including information concerning the device access request to said device interface part, and an in-processing list which holds said processing request data corresponding to the device access request for which said device interface part is currently processing by accessing the device to be operated;

a second device driver on a second one of said plurality of OSs has the same functions as said first task interface part of said first device driver on said one of said plurality of OSs and comprising a second task interface part which performs inter-operating system communication with said device interface part;

said second task interface part creating said processing request data in accordance with the device access request from a requestor task on the second one of said plurality of OSs, adding said processing request data to said request queue list, and notifying said device interface part;

said device interface part retrieving one of said processing request data from said request queue list, registering said one of said processing request data into said in-processing list, setting the device to be operated in accordance with the content of the processing request data, and causing the device to operate;

upon completion of the operation of said device, said device interface part storing a processing result for said device into the processing request data in said in-processing list, and notifying said second task interface part; and upon receipt of the notification from said device interface part, said second task interface part retrieving said processing request data from said in-processing list, referencing the content of said processing request data, and returning the processing result for said device to the requestor task.

8. The device driver system of claim 7, wherein said device interface part determines the order of a plurality of device access requests for the device to be operated, based on priorities of the device access requests sent from the first or second task interface parts.

9. The device driver system of claim 7, wherein said device interface part comprises a determination part which determines whether access to the device to be operated should be permitted, based on identification information for the second one of said plurality of OSs on which said second device driver is running and identification information of the requestor task for each device access request.

10. The device driver system of claim 7, wherein said request queue list further consists of a plurality of lists each of which is associated with each of said plurality of OSs.

11. The device driver system of claim 7, wherein said request queue list further consists of a plurality of lists in which different priorities are set, and when said retrieving said one of said processing request data from said request queue list, said device interface part retrieves said one of said processing request data based on the priority in one of said plurality of lists.

12. An inter-operating system (OS) device sharing method for a multiprocessor system with a plurality of Operating Systems (OSs) running thereon, each of the plurality of OSs having a device driver to access devices for shared use among said plurality of OSs; wherein a first device driver on one of said plurality of OSs comprising a device interface part which accesses a device to be operated, a first task interface part which receives a device access request from a task running on said one of said plurality of OSs and returns a device access result to said task, a request queue list which holds processing request data including information concerning the device access request to said device interface part, and an in-processing list which holds said processing request data corresponding to the device access request for which said device interface part is currently processing by accessing the device to be operated;

wherein a second device driver on a second one of said plurality of OSs having the same functions as said first task interface part of said first device driver on said one of said plurality of OSs and comprising a second task interface part which performs inter-OS communication with said device interface part;

said inter-OS device sharing method comprising:

said second task interface part creating said processing request data in accordance with the device access request from a requestor task on the second one of said plurality of OSs, adding said processing request data to said request queue list, and notifying said device interface part;

said device interface part retrieving one of said processing request data from said request queue list, registering said one of said processing request data into said in-processing list, setting the device to be operated in accordance with the content of the processing request data, and causing the device to operate;

upon completion of the operation of said device, said device interface part storing a processing result for said device into the processing request data in said in-processing list, and notifying said second task interface part; and upon receipt of the notification from said device interface part, said second task interface part retrieving said processing request data from said in-processing list, referencing the content of said processing request data, and returning the processing result for said device to the requestor task.

13. The inter-OS device sharing method of claim 12, further comprising:

during inter-OS communication between said second task interface part and said device interface part,
  registering an invoked routine;
  storing an identifier of said invoked routine and an argument to be passed to the invoked routine into an inter-OS shared memory area;
  notifying one of said plurality of OSs by an inter-processor interrupt mechanism of the multiprocessor system, and when receiving said inter-processor interrupt, an interrupt handler of said one of said plurality of OSs reading the identifier of the invoked routine and the argument to be passed to the invoked routine from the inter-OS shared memory area, and invoking the registered invoked routine based on the identifier and the argument.

14. The inter-OS device sharing method of claim 12, wherein said device interface part comprises a determination part which determines whether net access to the device to be operated should be permitted, based on identification information for the second one of the plurality of OSs on which said second device driver is running and identification information of the requestor task for each device access request.

15. The inter-OS device sharing method of claim 12, wherein said request queue list further comprises of a plurality of lists in which different priorities are set, and
when said retrieving said one of said processing request data from said request queue list, said device interface part retrieving said one of said processing request data based on the priority in one of said plurality of lists.

* * * * *